US009021757B2

(12) United States Patent
Hangel

(10) Patent No.: US 9,021,757 B2
(45) Date of Patent: May 5, 2015

(54) TOWER CONSTRUCTION AND A METHOD FOR ERECTING THE TOWER CONSTRUCTION

(75) Inventor: Jørgen Hangel, Vejle Ø (DK)

(73) Assignee: Conelto ApS, Give (DK)

( * ) Notice: Subject to any disclaimer, the term of this patent is extended or adjusted under 35 U.S.C. 154(b) by 0 days.

(21) Appl. No.: 13/576,455

(22) PCT Filed: Jan. 31, 2011

(86) PCT No.: PCT/DK2011/050022
§ 371 (c)(1),
(2), (4) Date: Aug. 23, 2012

(87) PCT Pub. No.: WO2011/091799
PCT Pub. Date: Aug. 4, 2011

(65) Prior Publication Data
US 2012/0311948 A1 Dec. 13, 2012

(30) Foreign Application Priority Data

Feb. 1, 2010 (DK) .................................. 2010 70030
Jun. 22, 2010 (DK) .................................. 2010 70284

(51) Int. Cl.
E02D 27/32 (2006.01)
F03D 11/04 (2006.01)
B66C 1/66 (2006.01)
(Continued)

(52) U.S. Cl.
CPC . F03D 11/04 (2013.01); B66C 1/66 (2013.01); E04H 12/16 (2013.01); F03D 1/001 (2013.01); F05B 2230/60 (2013.01); Y02E 10/728 (2013.01)

(58) Field of Classification Search
USPC .......... 52/223.3, 223.4, 223.5, 223.9, 223.14, 52/295, 297, 745.18, 698
See application file for complete search history.

(56) References Cited

U.S. PATENT DOCUMENTS 455,888 A 7/1891 Rosenfeld
1,553,158 A 9/1925 Henderson
(Continued)

FOREIGN PATENT DOCUMENTS

CN 2881142 Y 3/2007
CN 101163843 A 4/2008
(Continued)

OTHER PUBLICATIONS

EP1262614, Kopatschek, Dec. 2002.*
(Continued)

Primary Examiner — Jeanette E Chapman
Assistant Examiner — Daniel Kenny
(74) Attorney, Agent, or Firm — James Creighton Wray

(57) ABSTRACT

A concrete tower construction has a foundation and a plurality of prefabricated concrete tower elements, each having an outside, an inside, a material thickness provided there between, and top and bottom surfaces. The tower elements have hollow centers and are arranged one tower element on top of another, forming a column on top of the foundation. Plural tendons arranged in the hollow center apply tension force to the column. An upper force distribution element is arranged on top of the column, and a lower force distribution element is arranged in the foundation. Each tendon is connected to the upper force distribution element and the lower force distribution element by cooperating attachments. Methods of erecting the tower construction, tower elements and a foundation are described.

21 Claims, 25 Drawing Sheets

(51) Int. Cl.
*E04H 12/16* (2006.01)
*F03D 1/00* (2006.01)

(56) References Cited

U.S. PATENT DOCUMENTS

| | | | |
|---|---|---|---|
| 4,818,146 A * | 4/1989 | Fontenot | 405/212 |
| 5,038,540 A * | 8/1991 | Krautz | 52/245 |
| 6,948,290 B2 * | 9/2005 | Ritz | 52/651.02 |
| 8,104,242 B1 * | 1/2012 | Fouad et al. | 52/223.4 |
| 8,656,678 B2 * | 2/2014 | MacDonald | 52/562 |
| 2006/0156681 A1 | 7/2006 | Fernandez | |
| 2009/0178352 A1 * | 7/2009 | Huff et al. | 52/223.8 |
| 2012/0266552 A1 * | 10/2012 | Huynh Tong et al. | 52/223.4 |

FOREIGN PATENT DOCUMENTS

| | | |
|---|---|---|
| DE | 202005010398 | 6/2012 |
| EP | 1262614 A2 | 12/2002 |
| JP | 2004011210 A | 1/2004 |
| WO | 0201025 | 1/2002 |
| WO | 2008136717 A1 | 11/2008 |

OTHER PUBLICATIONS

Concrete Towers for Onshore and Offshore Windfarm, The Concrete Center, Ref TCC/02/05, 2007, ISBN 1-904818-48-X.

* cited by examiner

TOWER CONSTRUCTION AND A METHOD FOR ERECTING THE TOWER CONSTRUCTION

This application claims the benefit of Danish Application No. PA 2010 70030 filed Feb. 1, 2010, Danish Application No. PA 2010 70284 filed Jun. 22, 2010 and PCT/DK2011/050022 filed Jan. 31, 2011, International Publication Number WO 2011/091799, which are hereby incorporated by reference in their entireties as if fully set forth herein.

FIELD OF THE INVENTION

The present invention relates to a concrete tower construction comprising; a foundation, a plurality of prefabricated concrete tower elements each comprising an outside wall having a hollow centre, said tower elements arranged in a column on top of the foundation and a plurality of tendons arranged in the hollow centre or within the material thickness, for applying a tension force to the column.

The present invention furthermore relates to a method for erecting a tower construction.

The present invention also relates to a concrete tower element having an outside, an inside, a material thickness provided there between, and top and bottom surfaces, said tower element having a hollow centre.

Furthermore the invention also relates to a concrete foundation element having an outside, an inside, a material thickness provided there between, and top and bottom surfaces, said foundation element having a hollow centre.

Even further the invention relates to an interlinking element.

BACKGROUND OF THE INVENTION

Towers for wind turbines have preferably been made of steel by the wind turbine industry for the past 30 years. Development of the industry has been towards larger wind turbines with rotors of increasing diameter. This has required the wind turbine tower to increase in height.

The cost of wind turbine towers has therefore increase over the past years, and especially the logistics of transporting the steel sections comprising the wind turbine towers have proved to be a challenge. Usually the towers have been transported in sections of up to 30 meters. The towers now approach a height of 100 meters and more. Therefore the tower may comprise four or more sections.

Steel reinforced concrete towers, which were introduced in the 1930s, have recently gained favour again for tower heights of more than 80 meters. For concrete towers there are two main options: site-mixed concrete or prefabricated concrete towers.

Site-mixed concrete towers have some disadvantages, for example the difficulty in controlling the quality of the concrete and the logistics in transporting the concrete mixture to the site. Site-mixed concrete towers will not be discussed any further.

Prefabricated concrete towers may be manufactured at a central location. The process of mixing concrete and setting the concrete may be controlled in such a way as to produce concrete elements with relatively low manufacturing tolerances. The material will be uniform, and hence the strength of the prefabricated concrete elements will be uniform.

With prefabricated concrete towers, the transportation disadvantages of the steel towers are overcome. Size of the concrete elements composing the tower is selected such that they allow road or rail transport.

A method of fabricating a prefabricated concrete tower is based on segments prefabricated in a central manufacturing site. The segments are produced using conventional manufacturing techniques. When the sections have set, they are transported to the site and placed on top of each other and bonded together. The towers are provided with longitudinal tubes in the wall of each segment evenly distributed along their circumference for inserting tendons, which are tensioned when the assembly is complete. The concrete tower is pre-stressed such that the tower is in tension during all operational conditions of the wind turbine.

An example of such tower is known from WO 02/01025. The disadvantage of the tower described in WO 02/01025 is that the tendons are not accessible for inspection. This has been solved in EP 1 262 614 which describes a tower construction comprising a foundation, a plurality of annular sections placed on top of each other and with a steel tower placed on top of the concrete part of the tower construction. The tower construction has tendons spanning the length of the tower construction. The steel tower placed on top of the concrete section comprises attachments means for one end of the tendons. The other end of the tendons terminates inside a space in the foundation. The tendons are pre stressed against the concrete foundation by a hydraulic jack and wedged against the concrete by an anchoring element.

Although the system described in EP 1 262 614 may be successfully implemented, the system has some disadvantages.

In a tower of considerable height, for example towers exceeding 80 meters, the prestressing of the tendons will apply very high local forces in the foundation where the anchor elements are abutting the foundation. Therefore, the foundation needs to be oversized in order to be able to take up the forces without cracking or the number of tendons need to increase, which in turn, requires the diameter of the tower to increase to accommodate the increased number of tendons.

It is another disadvantage that the tower segments may be difficult to position along the centreline of the tower such that the tower is straight.

OBJECT OF THE INVENTION

The object of the present invention is to provide an improved concrete tower construction.

DESCRIPTION OF THE INVENTION

According to the present invention, this objective is achieved by a concrete tower construction comprising; a foundation, a plurality of prefabricated concrete tower elements each comprising an outside wall having an outside, an inside, a material thickness provided there between, and top and bottom surfaces, said tower element having a hollow centre, said tower elements arranged in a column on top of the foundation and a plurality of tendons arranged in the hollow centre or within the material thickness, for applying a tension force to the column, wherein the tower construction further comprises an upper force distribution element arranged on top of the column and a lower force distribution element arranged in the foundation, wherein each tendon is connected to the upper force distribution element and the lower force distribution element by co-operating attachment means, and that the foundation includes at least one prefabricated concrete foundation element comprising an outside wall having an outside, an inside, a material thickness provided there between, and top and bottom surfaces, said foundation element having a hollow centre, said at least one foundation element is arranged between the column and the lower force distribution element, for forming a foundation column below the surface of the ground.

Furthermore this objective is achieved by a method for erecting a tower construction comprising the following steps:
a. establishing the foundation having a lower force distribution element,
b. providing a plurality of prefabricated concrete tower elements, each having an outside, an inside, a material thickness provided there between, and top and bottom surfaces, said tower element having a hollow centre,
c. forming a column by arranging one tower element on top of another until the final height of the column is reached,
d. providing a plurality of tendons,
e. connecting each tendon to the upper force distribution element and the lower force distribution element by co-operating attachment means, and
f. tensioning each tendon for applying a tension force to the column.

Furthermore this objective is achieved by a concrete tower element having an outside, an inside, a material thickness provided there between, and top and bottom surfaces, said tower element having a hollow centre, wherein the tower element includes a plurality of protrusions extending into the hollow centre, wherein the protrusions has a hollow bore, said hollow bore extend parallel to the longitudinal axis of the tower element.

Furthermore this is also achieved by a concrete foundation element having an outside, an inside, a material thickness provided there between, and top and bottom surfaces, said foundation element having a hollow centre, wherein the foundation element includes a plurality of attachment means on the outside, and wherein each attachment means is arranged for attachment to a rebar or rebar cage.

Furthermore this is also achieved by an interlinking element comprising an outside wall having an outside, an inside, a material thickness provided there between, and top and bottom surfaces, said interlinking element having a hollow centre, wherein the interlinking element has attachment means, wherein the attachment means are adapted for co-operation with attachment means on an interlinking tendon.

With a tower construction according to the invention an improvement of the transfer of forces between the tendons and the concrete tower elements is achieved. The tension force which is transferred from the tendons to the concrete is efficiently distributed to the concrete elements in a way that avoids the introduction of local stress concentrations exceeding the yield stress of concrete, and thereby avoiding fracturing of the concrete.

The pre-tensioning of each tendon may thereby reach a higher value with the more effective utilisation of the strength of the tendons. This allows for the construction of taller towers having fewer tendons allowing for a smaller diameter tower.

With the method according to the invention an improvement of the transfer of forces between the tendons and the concrete tower elements is achieved.

With the concrete tower element according to the invention an improvement is achieved, wherein the tower element is easy to locate and orientate.

With the concrete foundation element according to the invention an improvement is achieved, wherein the foundation element may comprise a higher strength material compared to an in-situ cast reinforced concrete foundation.

The foundation for the tower construction may be in-situ cast or constructed of a plurality of prefabricated foundation elements.

A foundation composed of prefabricated foundation elements may be manufactured in a controlled environment providing improved material properties and allowing for tighter geometrical tolerances.

A foundation composed of prefabricated foundation elements may be positioned in an excavation for the foundation. A rebar cage may be established around the foundation elements and an in-situ cast concrete foundation is established around the prefabricated elements. The rebar cage is connected to the attachment means on the outside of the foundation elements.

Said at least one prefabricated foundation elements will form a foundation column below the surface of the ground and embedded into in-situ cast reinforced concrete. The tower elements are forming a tower column above the surface and on top of the foundation column. Upon tensioning of the tendons the tower elements and the said at least one foundation element are effectively forming a single structural element which is embedded into the foundation.

It is herewith achieved that the bending forces of the tower is primarily transferred through surface friction between the foundation elements and the in-situ cast concrete.

In the prior art of steel towers on a concrete foundation, the bending forces are transferred through a bottom flange of the tower to the foundation. In EP 1 262 614 the bending forces and the tension forces applied by the tendons is reacted through the bottom surface of the lower most tower element to the foundation. Both construction methods cause comparably large local stresses. Therefore the towers are conical to provide a larger surface for reacting the bending force to the foundation.

In an alternative embodiment the foundation elements and the tower elements are identical.

The prefabricated concrete tower elements may also be manufactured in a controlled environment for providing improved mechanical properties of the material and tighter geometrical tolerances.

The concrete used for the tower elements and optionally the pre-cast foundation elements may be a high-strength concrete, for example compact reinforced composite (CRC), where ductility is achieved through incorporation of a large content of short, stiff and strong fibres. The strength of compact reinforced composite is about 150-400 MPa. Recent material development has increased the strength of the high-strength concrete to approach 800 Mpa.

The tower elements are placed on top of the foundation and arranged in a column comprising the number of tower elements necessary to reach the desired height of the tower construction.

The hollow centre, apart from housing the tendons, may also house a stairway or elevator to provide access to the top of the tower. The stairway may also be used during inspection of the tendons.

The tendons may also be arranged within the material thickness of the tower elements and/or foundation elements, said elements having hollow bores to accommodate the tendons. The tendons may hereby be isolated form environmental influences having a degrading effect on the life of the tendons, the tendons may still be inspected by for example applying a tension force to the tendon and measure the elongation.

When the desired height of the column has been reached, the tendons are tensioned. The tension ensures that the column, and hence the tower elements, always will be in compression, even though the tower is subject to bending forces. This is because the compressive strength of concrete is much higher than the bending strength.

The tendons are connected to the force distribution elements by co-operating attachments means.

The term "connected to" designate any means to transfer force from the tendons to the force distribution elements. For example abutment, welding, clamping or any other means of mechanically transferring the force from the tendon to the force distribution element.

The lower force distribution element is arranged in the foundation. A space sufficient to provide access to installing and tensioning the attachment means is provided at the lower force distribution element.

The arrangement of the lower force distribution element may be by casting the lower force distribution element into the concrete foundation or by providing a support surface on the concrete foundation. The lower force distribution element is preferably of a high strength material, for example carbon composite, steel, titanium or other material with a high yield strength and ductility.

In a preferred embodiment the tower construction is peculiar in that the lower force distribution element is a reinforced high strength concrete casting. For example the reinforcement may be metal, composite or plastics.

The upper force distribution element is located on top of the upper most tower element. The upper force distribution element may be attached to the upper most tower element or held in loose abutment by friction when the tendons are tensioned.

Alternatively the upper force distribution element may be integrated into the top tower element.

The upper force distribution element is preferably of a high strength material, for example carbon composite, steel, titanium or other material with a high yield strength and ductility.

In a preferred embodiment the tower construction is peculiar in that the upper force distribution element is a reinforced high strength concrete casting. For example the reinforcement may be metal, composite or plastics.

A shim may be arranged between adjacent tower elements or on the top and bottom surfaces of every other tower element. The purpose of the shim is to even out any surface irregularities between adjacent elements. The shim may also provide friction between adjacent elements such that relative rotation between elements due to torsion is avoided. The shim may be solid, semi-solid or liquid upon application.

For example the shim material may be epoxy binder. Epoxy is liquid upon application and will even out any surface irregularities between adjacent elements and on the same time provide a significant friction between elements. Another example of a shim material may be neoprene, which will even out any surface irregularities between adjacent elements. Neoprene may also provide the necessary friction between adjacent elements to avoid relative rotation of the elements.

In a further embodiment according to the invention, the tower construction is peculiar in that the upper force distribution element and/or the lower force distribution element is an annulus, wherein the annulus has a free portion for attachment of the tendons.

It is herewith achieved to provide a simple means of distributing the force across the top surface of the uppermost tower element and/or distributing the force across the abutment surface between the lower force distribution element and the foundation.

The tendons may be attached to the free portion of the force distribution element. The free portion may be overlapping the hollow centre of the tower elements or provided by a recess on the inside of the tower element below the upper force distribution element next to each tendon allowing the tendon to be attached to the force distributing element above the material thickness of the tower elements.

It is preferred that the attachment point of the tendon to the force distribution element is as close to the inside of the tower elements as possible.

Alternatively a recess is provided on the inside of the tower element or foundation above the lower force distribution element next to each tendon allowing the tendon to be attached to the force distributing element below the material thickness of the tower elements.

In a further embodiment the tower construction according to the invention is peculiar in that the tower elements is a cylinder or a frustum, having an upper wide end and a lower narrow end or a combination of said cylinder and frustum.

With cylindrical tower elements it is achieved that the casting of the tower elements is simplified. Furthermore, the strengths properties of the cylinder are symmetrical in all directions. Therefore the tower construction is especially suited for use in installations where the loads are changing and coming from different directions.

With tower elements as a frustum it is achieved that the lifting of the tower elements is achieved in a simple manner. The lifting equipment may clamp on the outside of the tower element which has an increasing size towards the top. The lifting equipment is capable of lifting the tower elements without adding excessive clamping forces. The same is achieved with a tower element having one cylindrical portion and one frustum shaped portion.

In a further embodiment the tower construction according to the invention is peculiar in that the tower elements includes a plurality of protrusions extending into the hollow centre, wherein the protrusions has a hollow bore, said hollow bore extend parallel to the longitudinal axis of the tower construction.

A tendon is run through the protrusions and may therefore be guided during the erection of the tower construction. The protrusion may be embedded in the pre cast tower element or attached to the tower element after setting of the concrete or be a bracket attached on the inside of the tower element.

The protrusions may be evenly distributed on the inside surface or be unevenly distributed to give way for attachment of other equipment to the inside surface of the tower elements for example a stairway. Each tendon or only a sub set of the tendons may run through protrusions.

In a further embodiment the tower constructions according to the invention is peculiar in that the protrusions extend between the top and bottom surfaces of the tower elements. It is herewith achieved that the protrusions may add to the surface area of the tower elements. Thus the protrusions are able to transfer forces between the tower elements.

In a preferred embodiment the tower construction according to the invention is peculiar in that the tower elements have at least six or more preferably evenly incrementing number of protrusions evenly distributed along its inner periphery.

During erection of the tower construction this is advantageous because at least six tendons may run through the tower construction during the entire erection process being guided by the protrusions. The tendons will guide the tower elements in place such that it becomes easy to orient and precisely locate the tower elements on top of each other.

Three of the tendons for example every other tendon may be tensioned during the erection of the tower construction, using non-permanent attachment means for example wedges to be inserted between the tendons and the bore of the protrusions. The tower elements will be held together in compression by the tensioned tendons so that the structural integrity of the tower is ensured during the erection. When an additional tower element is placed in the column the three tendons that are free may be guided through the protrusions of the additional tower elements, tensioned to place the tower in compression, where after the previously tensioned tendons are released and run through the remaining protrusions of the additional tower elements, where after the next additional tower element may be introduced to the column and secured by the free tendons.

All tendons may also be tensioned during the erection of the tower, so that the compression forces are more evenly distributed. Upon adding a tower element to the column the tension forces in one tendon is relieved. The tendon is fed through the added tower element. Tension is applied to the tendon for securing the tower element. The process is repeated with the next tendon until all tendons have been secured to the added tower element. The sequence in which the tendons are fed through the added element is such that the next tendon is selected as far from the previous tendon in a cross pattern.

The tendons may be inspected after installation by removal and reinstallation. Alternatively the total number of tendons may be selected such that the tendons outside the protrusions provide sufficient tension force after the tower has been installed.

In an even more preferred embodiment the number of protrusions is eight. Providing an even better distribution of compression forces when the tower is erected.

The interlinking element allows for the tower to be sectionalised. The sections may be compressed individually. The interlinking tendons will provide the primary compression force in each section. As the interlinking tendons are not spanning the entire length of the tower the elongation of each interlinking tendon when it is tensioned is less than the elongation of the tendons which span the entire length of the tower.

Furthermore the size of the tower elements and the number of interlinking tendons may taper towards the top of the tower lowering the overall weight of the tower.

In a further embodiment the tower construction according to the invention is peculiar in that wherein adjacent tower elements has corresponding conical top and bottom surfaces. It is herewith achieved that the tower elements may centre more easily due to the conical shape of the top surface of one tower element and bottom surface of an adjacent tower element.

The angle of the conical surface is preferably larger than 0° and less than 10°. It is important that the angle is not too high to avoid the transfer of shear forces between tower elements.

In a further embodiment the tower construction according to the invention is peculiar in that the tower construction further comprises a top tower element, wherein said top tower element is attached to the top of the column with co-operating fastening means and wherein the top tower element has additional fastening means arranged for installation of a wind turbine nacelle.

It is herewith achieved that a wind turbine nacelle may be connected to the tower construction. The top tower element acts an adapter between the tower construction and the wind turbine nacelle. The top tower element may be made of steel. The additional fastening means may be the yaw mechanism attached to the top of the top tower element and the bottom of the wind turbine nacelle.

In a further embodiment the tower construction according to the invention is peculiar in that said tower construction further comprises at least one interlinking element comprising an outside wall having an outside, an inside, a material thickness provided there between, and top and bottom surfaces, said interlinking element having a hollow centre, said at least one interlinking element is arranged between the lower and the upper force distribution elements, and said tower construction further comprises a plurality of interlinking tendons, wherein each interlinking tendon is arranged in the hollow centre of the interlinking element, wherein the interlinking element end the interlinking tendon has co-operating attachment means, and wherein each interlinking tendon at one end is attached to an interlinking element, and at the other end to the upper force distribution element or the lower force distribution element or a further interlinking element.

It is herewith achieved that the column of the tower construction may be sectionalised. The boundaries of each section are at one end an interlinking element and at the other end the upper or the lower force distribution elements or an additional interlinking element. The sections include the tower elements and where applicable foundation elements. In the following description a section including the lower force distribution element may include foundation elements and/or tower elements. However the foundation elements and the tower elements will be regarded as equivalents.

A tower with two sections will have one interlinking element arranged between the upper and the lower force distribution element with interlinking tendons spanning between the interlinking element and the force distribution elements, thus only spanning part of the column height.

A tower with more than two sections will have at least one section, which has an inter-linking element at either end. Interlinking tendons connects the interlinking elements.

The column has a plurality of tendons connected to the upper and the lower force distribution elements, as these tendons are used for stabilising the column during construction of the tower.

The interlinking element and the interlinking tendons has co-operating attachment means as well as the interlinking tendons and the lower and upper force distribution elements.

The tower elements in one section may be different than a tower element in another section.

Tower elements closer to the bottom of the tower need to be stronger than tower elements closer to the top of the tower. A strong tower element will have a high weight compared to a less strong tower element. When the tower is sectionalised the tower elements in each section may be identical and optimized for the highest load condition in that particular section. Furthermore the number of interlinking tendons applying compression forces to a section may differ from section to section throughout the tower construction depending on the compression force needed in each section.

In the lower most section of the tower, the tower elements/foundation elements may be strong, heavy and have a high number of interlinking tendons. The tower elements in sections above the lower most section of the tower will have tower elements, with a gradually decreasing strength, weight and number of interlinking tendons. It is herewith achieved that the weight of the tower is decreased especially closer to the top of the tower, which in it self will lower the strength requirement of the lower most tower elements.

The length of each section in a tower construction is a trade-off between the number of different tower elements and the strength/weight optimisation. For manufacturing purposes the preferred number of different tower elements is small and preferably all tower elements are identical, but for strength/weight optimisation the preferred number of different tower elements is high and preferably all tower elements are different. It is therefore necessary to apply engineering analysis to establish the most cost effective number of different tower elements. The sections may be of uneven length or identical length dependent on the strength distribution along the height of the tower.

For example the lower most sections may have a shorter length than sections closer to the top of the tower, because the weight of the lower most sections are higher and therefore the gain of changing to a new size tower element is higher.

The interlinking element may be cast concrete, cast high-strength concrete, fibre reinforced composites, or a suitable metallic material. Interlinking elements composed of concrete may be provided with a rebar cage.

The geometry of each interlinking element is such that it may be arranged between to tower elements of a non-identical or identical size. Typically no two interlinking elements may be identical throughout one tower construction. However, the construction may allow for two or more identical interlinking elements. If the tower elements comprise protrusion with through going tendons the interlinking elements will have corresponding protrusions to take up the tendons.

In an alternative embodiment of the tower construction the lower and/or the upper force distribution element is identical to the interlinking element.

In a further embodiment the tower construction according to the invention is peculiar in that the tower elements further comprises an inside wall arranged inside the hollow centre and having an outside and an inside and a material thickness provided there between, wherein the inside wall is connected to the outside wall by a plurality of webs.

It is herewith achieved that the moment of inertia and therefore the strength of a given tower element is increased significantly for a comparatively small weight increase.

The tendons and interlinking tendons, if applicable, is arranged between the outside wall and the inside wall.

An elevator may be provided within the inside wall. A cavity within the inside wall will act as an elevator shaft. Reinforced openings in the inside wall is provided near the bottom of the tower. The elevator may also be accessed from below the lower force distribution element. Further openings may be provided along the length of the shaft to allow access to the area between the outside and inside wall for inspection of the tendons and the interlinking tendons.

The webs may also have an opening to allow access to all interlinking tendons. The opening in the webs, subject to the stresses in the webs, may also be provided to lighten the tower construction.

The elevator shaft will terminate near the top of the tower to allow access to the top of the tower and any installations here, for example the nacelle of a wind turbine.

In a further embodiment the tower construction according to the invention is peculiar in that the foundation element further comprise an inside wall arranged inside the hollow centre and having an outside and an inside and a material thickness provided there between, wherein the inside wall is connected to the outside wall by a plurality of webs.

As for the tower element with an inside wall the inside wall of the foundation element may be used as an elevator shaft. The elevator shaft may thereby start below the lower force distribution element.

It is preferred that reinforced openings in the inside wall is provided in the foundation element to allow for access to the area between the outside and inside wall, such that the tendons and the interlinking tendons may be accessed and serviced.

The webs may also have an opening to allow access to all interlinking tendons. The opening in the webs, subject to the stresses in the webs, may also be provided to lighten the tower construction.

In a further embodiment the tower construction according to the invention is peculiar in that the interlinking element further comprise an inside wall arranged inside the hollow centre and having an outside and an inside and a material thickness provided there between, wherein the inside wall is connected to the outside wall by a plurality of webs.

It is herewith achieved that the moment of inertia and therefore the strength of a given interlinking element is increased significantly for a comparatively small weight increase.

As for the tower element with an inside wall the inside wall of the interlinking element may be used as an elevator shaft. The elevator shaft may thereby span across multiple tower sections.

It is preferred that reinforced openings in the inside wall is provided in the interlinking element to allow for access to the area between the outside and inside wall, such that the attachment means of the interlinking tendons may be accessed and serviced.

The webs may also have an opening to allow access to all interlinking tendons. The opening in the webs, subject to the stresses in the webs, may also be provided to lighten the tower construction.

In an alternative embodiment the tower construction according to the invention is peculiar in that additional tendons is provided within the inside wall of the tower elements, the foundation elements and the interlinking elements as applicable. The lower and upper force distribution elements are provided with attachment means which cooperates with attachment means on the additional tendons.

It is herewith achieved that the compression forces may be increased.

In a further embodiment the tower construction according to the invention is peculiar in that the tower construction further comprises at least one anchor flange, said anchor flange being arranged between two adjacent tower elements, and a plurality of anchor cables, said plurality of anchor cables being evenly distributed around the perimeter of the anchor flange, and each anchor cable being connected to the anchor flange at one end and being adapted for connection to a ballast arranged on the ground at the other end.

It is herewith achieved that the tower construction may be further stabilised. The anchor cables, which are connected to the tower construction via the anchor flange, are connected to a ballast or other anchoring means on the ground. The ballast or anchoring means is sized to prevent oscillations exceeding a set amplitude of the tower construction.

In a preferred embodiment the tower construction is peculiar in that the interlink element is configured with means for attachment to anchor cables, which are adapted for being attached to a ballast, for stabilising the tower construction.

A method of erecting a tower construction according to the invention is described in the following:

The foundation is established by excavating an area to the necessary depth.

One method of establishing the foundation is in-situ casting. For an in-situ cast foundation the shuttering and steel reinforcement is established. The lower force distribution element is positioned and levelled out as necessary and held in place during the casting of the foundation.

Another method of establishing the foundation is by prefabricated concrete foundation elements. If the tower foundation is established of prefabricated hollow foundation elements a first element may be positioned to support the lower force distribution element that is positioned and levelled out. Thereafter further prefabricated hollow foundation elements may be located on top of the lower force distribution element until the first tower element is placed on top of the upper most foundation element.

The foundation element that supports the lower force distribution element may have one shape and the foundation elements placed on top of the lower force distribution element may have another shape.

Commonly for the two methods are that the foundation has a hollow centre for accommodating the tendons, a space or cellar below the lower force distribution element providing access to installing and tensioning the tendons and an access path to the cellar and inside of the tower from the outside.

A first method of forming the column of tower elements on top of the foundation is described below.

The tower elements are placed in continuation of each other in a horizontal orientation or on top of another with the tower in a vertical orientation for forming a column.

The top and bottom surfaces of the tower elements may be prepared for contact by adding a suitable bonding material or a gasket to even out any surface roughness.

The column is positioned in a vertical orientation on top of the foundation using lifting equipment. The tendons are installed either before or after the column is placed on top of the foundation. The tendons are connected to the force distribution elements and tensioned as necessary to achieve the required compression forces in the tower construction.

A second method of forming the column of tower elements on top of the foundation is described below.

When said first tower element is located on top of the foundation the upper force distribution element is located on top of that element. The first tower element is secured for lifting using suitable lifting equipment.

The first tower element is then lifted to a sufficient height allowing a second tower element to be located on top of the foundation below the first tower element.

The top and bottom surfaces of the tower elements may be prepared for contact by adding a suitable bonding material or a gasket to even out any surface roughness.

When the top and bottom surfaces are prepared the first tower element is lowered onto the second tower element and the column is starting to form.

The now two tower elements are secured for lifting. Then the two tower elements forming a column is lifted to a sufficient height for allowing an additional tower element to be placed on top of the foundation and the column is lowered on to that additional tower element in a similar manner as for the first two tower elements. These steps are repeated while the column is continuously secured for lifting by the lifting equipment and possibly additional wires connected to ground anchors.

When the final height of the column is reached the tendons are run through the length of the column. The tendons are connected to the upper force distribution element and the lower force distribution element by cooperation attachment means. Alternatively the tendons are installed concurrent with the erection of the tower construction.

Then each tendon is tensioned following a predefined pattern for ensuring a symmetrical compression of the tower construction.

The advantage of the second method, wherein the tower is assembled in this bottom-up approach, is that the lifting equipment does not have to be able reach above the centre of mass of the tower. In both the first and second method the lifting equipment needs at least to be able to support the full weight of the tower column.

The column may be secured by tethers attached to the column in a symmetrical configuration for centring the column above the foundation. The tethers when tensioned apply a downwards force to the column that the lifting equipment also needs to overcome.

The tower element may be used in a tower construction according to any of the claims 1 to 13 and/or in a method according to any of the claims 14 to 18. Furthermore the tower element may be used in a tower construction comprising a foundation including foundation elements according to claim 20 or 21. Even furthermore the tower elements may be used in a tower construction comprising an interlinking element according to claim 22 or 23.

The foundation element may be used in a tower construction according to any of the claims 1 to 13 and/or in a method according to any of the claims 14 to 18. Furthermore the foundation element may be used in a tower construction comprising a column including tower elements according to claim 19. Even furthermore the foundation element may be used in a tower construction comprising an interlinking element according to claim 22 or 23.

In a further aspect the method for erecting a tower construction according to the invention is peculiar in that step of forming a column further comprises:
dividing the tower into sections by providing at least one interlinking element for each section,
inserting an interlinking element replacing a tower element at the end of each section during assembly,
providing a plurality of interlinking tendons,
connecting each interlinking tendon at one end of the section to the interlinking element and at the other end of the section to an element selected among the upper force distribution element, the lower force distribution element or an additional interlinking element, and
tensioning each interlinking tendon for applying a tension force to the section.

It is herewith achieved that the tower may be divided into sections, which enable optimisation of the tower elements with regards to strength and weight within each section. Each section is pre-tensioned upon completion and before the next section is begun.

A sectionalised tower construction according to the method above may be erected as follows:

Upon establishing the foundation having a lower force distribution element, the column is beginning to form by placing the upper force distribution element on top of the first tower element and positioning the two elements on top of the foundation. The two elements are secured to each other and lifted such that an additional tower element may be positioned between the column and the foundation. The column is lowered to make contact with the additional tower element. The additional tower element is connected to the column and the column is lifted again. These steps are repeated until the length of the first section of the column is complete. An interlinking element is replacing the additional tower element and connected to the column. A plurality of interlinking tendons is connected between the interlinking element and the upper force distribution element. The interlinking tendons are tensioned in a pattern as to avoid twisting of the section. The section is then completely pre-tensioned before the erection of the tower is complete.

During the erection process the tower may be stabilised and secured by connecting anchor wires to an interlinking element or an anchor flange. Each anchor wire may be connected to a winch with an auto torque function. The winch will have a set torque and during lifting of a section by using the lifting equipment the winch will automatically unwind during lifting. There will be at least three, preferably four anchor wires and associated winches evenly distributed around the tower. The winches will the automatically be able to stabilise the tower during lifting.

The column now comprises the first section. Lifting the column begins the next section. A tower element is positioned below the column and above the foundation. The tower element may be different from the tower elements in the first section. Additional tower elements are added to the column as before until the desired length of the second section is reached.

The tower elements within a section may be identical or different to each other.

The section may terminate by inserting an additional interlinking element at the end of the section replacing a tower element. Interlinking tendons are connected between the interlinking element and the additional interlinking element and tensioned.

The above steps of forming sections are repeated until prior to terminating the last section. Connecting and tensioning interlinking tendons between the interlinking element of the last but one section and the lower force distribution element terminate the last section.

A tower construction with only two sections only has one interlinking element. A tower construction with more than two sections has one interlinking element less than the total number of sections.

The tower elements, foundation elements and interlinking elements of the sectionalised tower construction may have a plurality of protrusions extending into the hollow centre, wherein the protrusions has a hollow bore, said hollow bore extend parallel to the longitudinal axis of the tower construction. A tendon is provided through each protrusion spanning the height of the tower. These tendons are primarily used during erection of the tower construction. The protrusions and tendons are of an even number of more than six, preferably eight. During erection of the tower the column is continuously in compression by at least three, preferably four tendons. This increases the safety during the erection of the tower construction as the elements in the column are held firmly together at all times.

The interlinking element may be provided with at least one aperture in the outside wall. The purpose of the aperture is to allow the interlinking tendons to be fed through the wall of the interlinking element.

It is herewith achieved that it is avoided to feed in the interlinking tendons from the top of the tower or from the bottom of the tower.

The tower construction may be land based or adapted for offshore installation.

In offshore installations the foundation comprising the lower force distribution element and foundation elements is established at the surface. The foundation is thereafter lowered a short distance towards the sea bottom. The tower elements are thereafter attached one by one on top of the foundation. The partly assembled tower construction is gradually lowered until the tower construction is high enough to span the distance from the sea floor to the sea surface. Hereafter the tower construction above the sea surface is erected using a conventional method similar to what is used in land based installations.

Alternatively the tower may be constructed in sections. Each section is positioned and connected to a previous section.

During the offshore installation the tower may be further stabilised using cables connected between the tower construction and ballasts on the sea floor.

DESCRIPTION OF THE DRAWING

The invention will be explained in more detail below with reference to the accompanying drawing, where.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1:
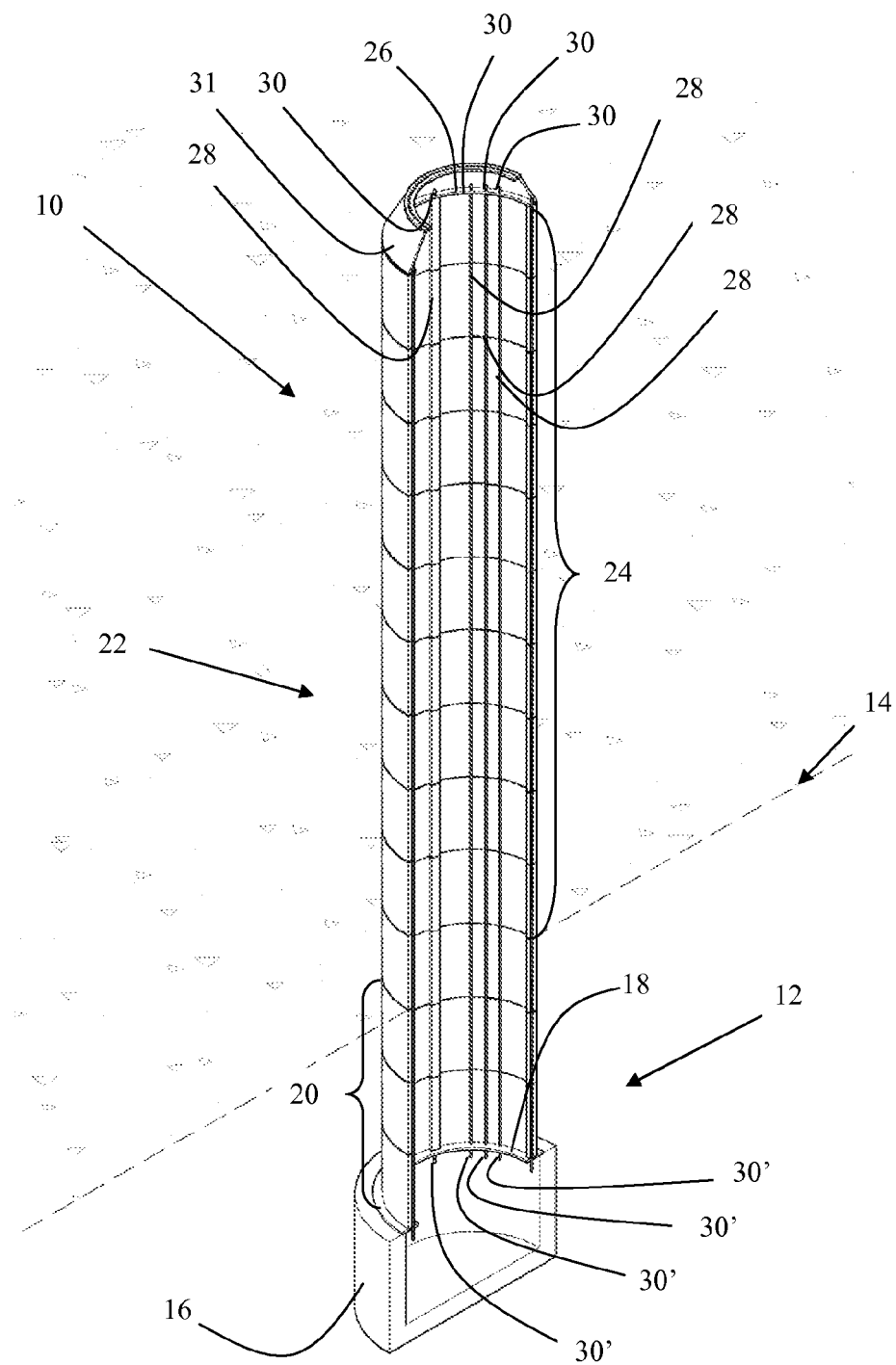
FIG. 1 shows an isometric section view of a tower construction according to the invention.

FIG. 1 shows an isometric section view of a concrete tower construction 10 comprising a foundation 12 below ground level 14. The foundation 12 comprises a prefabricated support element 16 as the lower most foundation element. The support element 16 may be fabricated in concrete. A lower force distribution element 18 is arranged on top of the support element 16. In the embodiment shown in FIGS. 1, 3, and 4 three prefabricated foundation elements 20 are located on top of the lower force distribution element 18. The foundation 12 further comprises and in-situ cast portion around the support element 16, the lower force distribution element 18 and the foundation elements 20. The in-situ cast portion is not shown on the FIG. 1 for clarity.

In alternative embodiments the foundation may include one or more support elements and second foundation elements. The number of foundation elements is determined by a number of factors for example the dimensions of the tower construction, static and dynamic forces applied by a load on the tower, wind loads, and the weight and dimensions of the foundation and foundation elements.

The lower and the upper force distribution elements 18, 26 are both an annulus with a free portion partly overlapping the hollow centre of the column 22.

A column 22 comprising a plurality of prefabricated concrete tower elements 24 is located in abutment with the upper most foundation element 20. An upper force distribution element 26 is arranged on top of the column 22.

The foundation elements 20 and the tower elements 24 have a hollow centre, wherein a plurality of tendons 28 is arranged. Each tendon 28 is connected to the upper force distribution element 26 at one end and to the lower force distribution element 18 by cooperating attachment means 30, 30' (only four tendons is shown on FIG. 1 for clarity). The attachment means 30' at the lower force distribution element 18 includes means for tensioning the tendons 28. The means for tensioning may be a nut engaging a thread on the tendons 28, or any other suitable means of applying tension and transferring the tension force from the tendons 28 to the lower force distribution element 18.

The tendons 28 may also be arranged within the material thickness 36 between the outside 32, an inside 34 of the hollow tower elements 24.

The support element 16 have an internal space for providing access to the attachment means 30'.

In the embodiment shown on FIG. 1 the foundation elements 20 are identical to the tower elements.

In an alternative embodiment the foundation 12 is an in-situ cast tower foundation.

A top tower element 31 is arranged on top of the column 22. The top tower element 31 is attached to the column 22 by co-operating fastening means (not shown). The top tower element 31 has additional fastening means (not shown) arranged for installation of a wind turbine nacelle (not shown).

Figure 2:
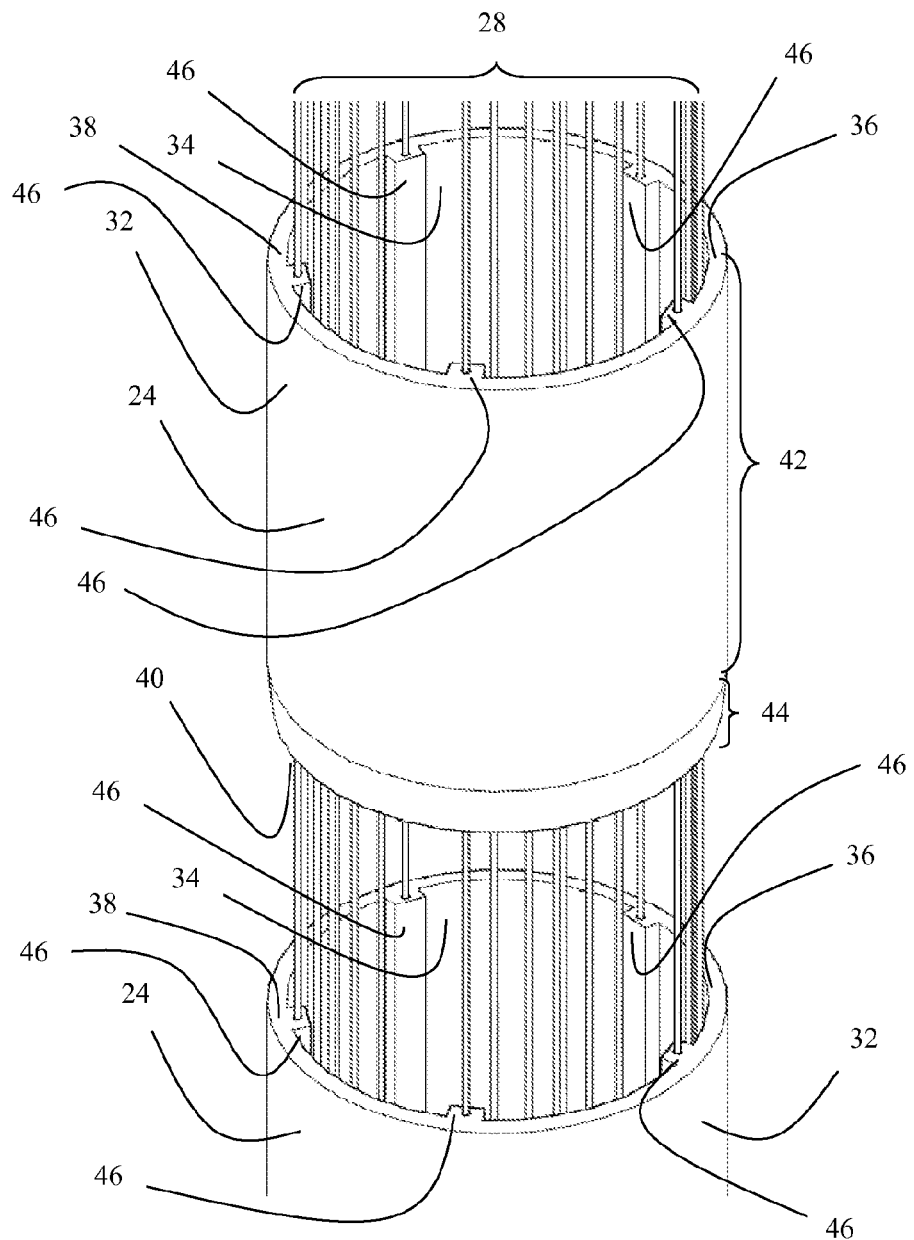
FIG. 2 shows an exploded view a first embodiment of two tower elements of the tower construction according to FIG. 1.

FIG. 2 shows an exploded view of two tower elements 24 of the tower construction 10 according to FIG. 1. The tower elements 24 each having an outside 32, an inside 34, a material thickness 36 provided there between, and top 38 and bottom surfaces 40, said tower element 24 having a hollow centre, said tower elements 24 are arranged one tower element 24' on top of another 24" forming a column 22 (se FIG. 1) on top of the foundation 12 (see FIG. 1).

The tower element has a cylindrical portion 42 and a frustum portion 44. The frustum portion 44 has its wide end above its narrow, such that the diameter is increasing towards the top of the tower element 24. The frustum portion 44 is adapted for co-corporation with lifting equipment (not shown), which will clamp onto the frustum portion 44 during lifting of the tower elements 24.

A plurality of tendons 28 is running through the hollow centre of the tower elements 24 close to the inside 34.

The tower elements 24 include a plurality of protrusions 46. The protrusions 46 are extending between the top 38 and bottom 40 surfaces. Each protrusion 46 has a hollow bore that is parallel with a longitudinal axis through the tower element 24 and hence the tower construction 10 (see FIG. 1). A tendon 28 is running through each protrusion 46 for assisting the alignment of the tower elements 24 during assembly of the column 22.

Figure 3:
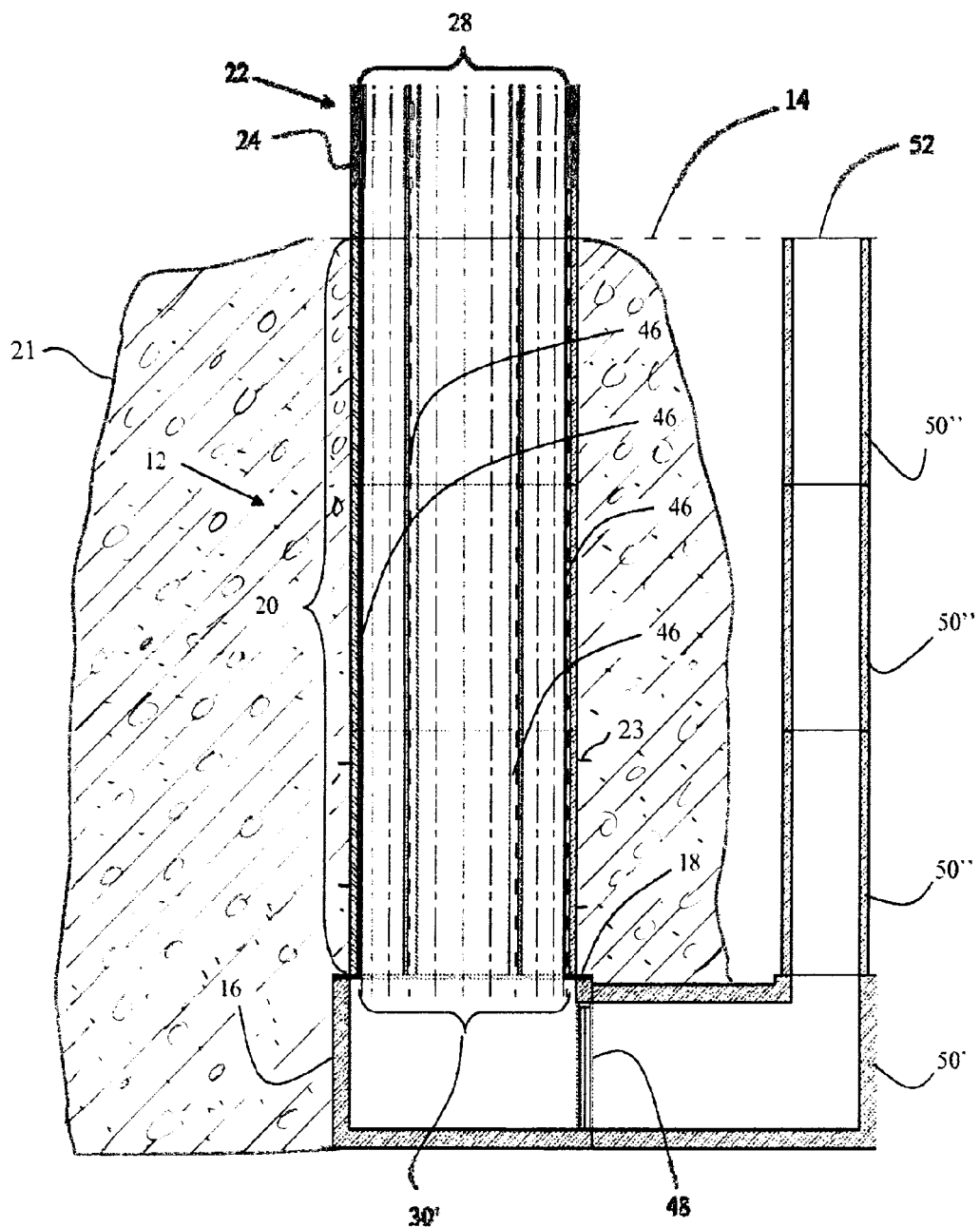
FIG. 3 shows a cross sectional side view of a foundation of the tower construction according to FIG. 1.

FIG. 3 shows a cross sectional side view of a foundation 12 of the tower construction 10 according to FIG. 1. The support element 16 has an access opening 48 for providing access for service and maintenance personnel to the inside of the tower construction 10. The access is hereby provided without influencing the structural integrity of the tower construction 10.

The access opening 48 is connected to a plurality of prefabricated access shaft elements 50', 50". The shaft elements 50" provides and opening 52 at ground level 14.

The in-situ cast portion 21 and attachments 23 for a rebar cage are stylistically indicated in FIG. 3.

Figure 4:
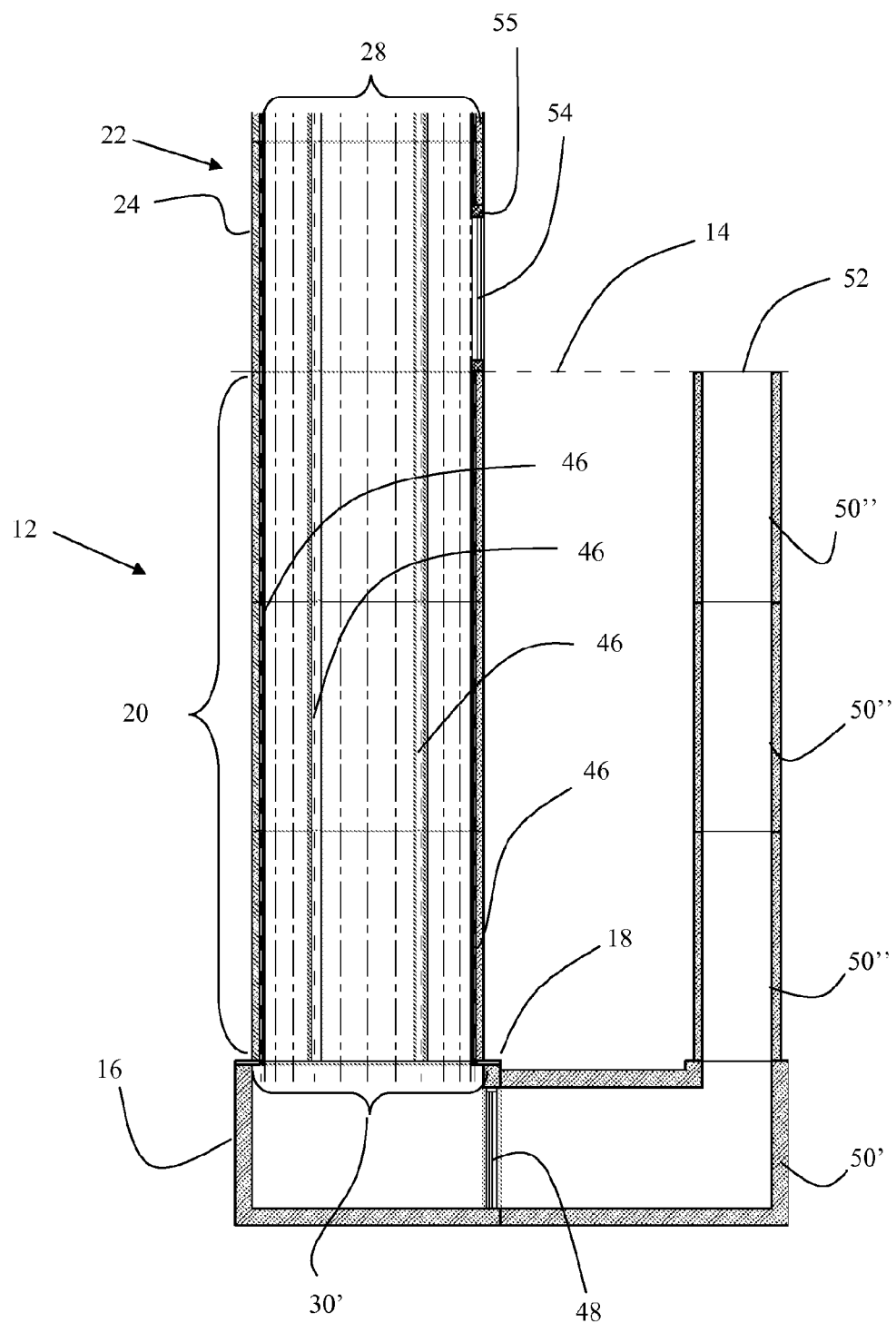
FIG. 4 shows a cross sectional side view of a foundation of the tower construction according to an alternative embodiment.

FIG. 4 shows a cross sectional side view of a foundation 12 of the tower construction 10 according to an alternative embodiment. The support element 16 has an access opening 48 for providing access for service and maintenance personnel to the inside of the tower construction 10. The access is hereby provided without influencing the structural integrity of the tower construction 10.

The access opening 48 is connected to a plurality of prefabricated access shaft elements 50', 50". The shaft elements 50" provides and opening 52 at ground level 14.

A conventional access door 54 is provided in a tower element 24. This door 54 and the associated structural discontinuity has structural impact on the structural integrity of the tower construction 10. The tower element 24 therefore needs to be reinforced by introducing a reinforced frame 55 around the door opening. The frame 55 may have attachment for the tendons 28 in the top and bottom for transferring the tension forces.

Figure 5:
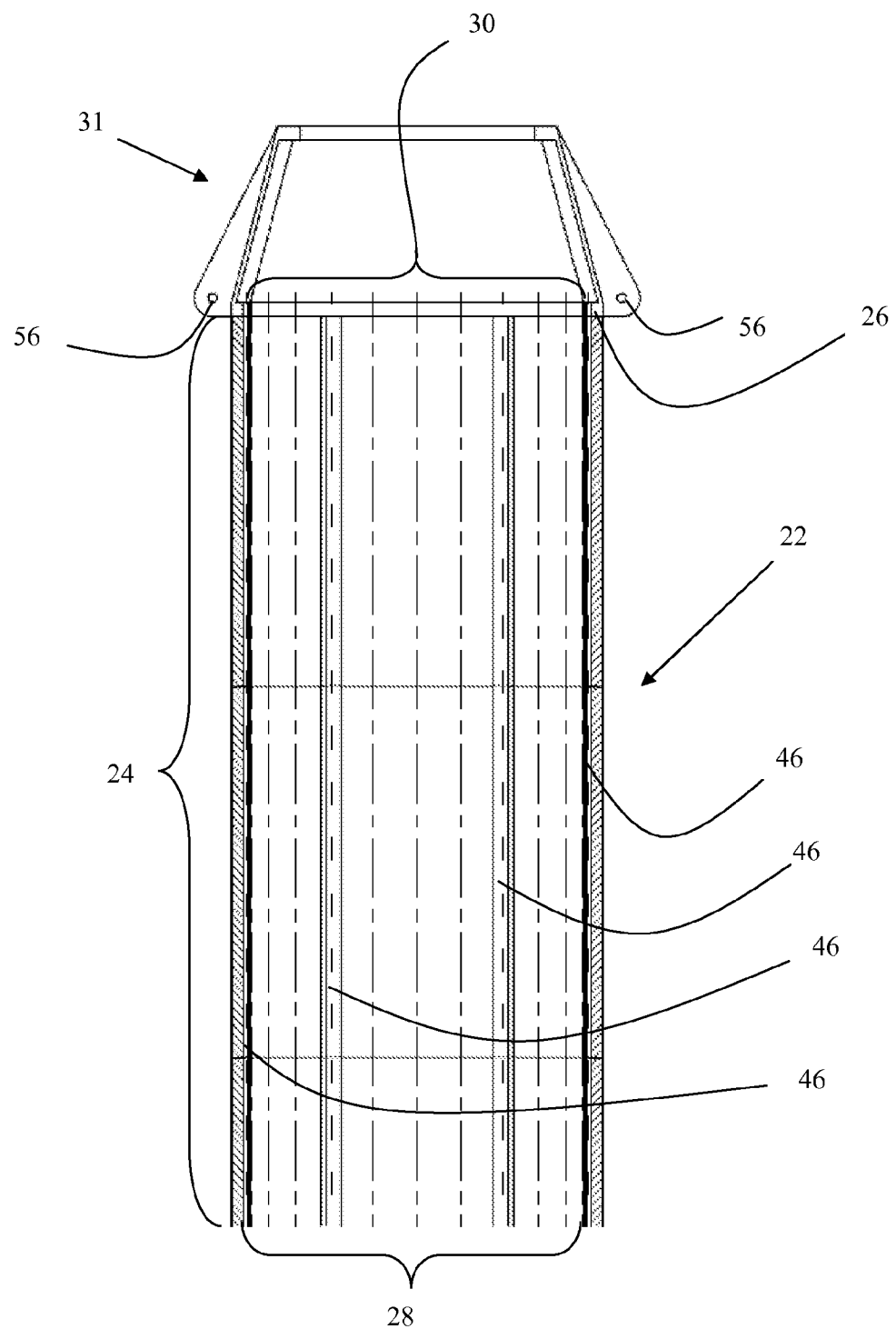
FIG. 5 shows a cross sectional side view of the upper part of the tower construction according to FIG. 1.

FIG. 5 shows a cross sectional side view of the upper part of the tower construction according to FIG. 1. A top tower element 31 is arranged on top of the column 22. The top tower element 31 is attached to the column 22 by co-operating fastening means (not shown). The top tower element 31 has additional fastening means (not shown) arranged for installation of a wind turbine nacelle (not shown).

Figure 6A:
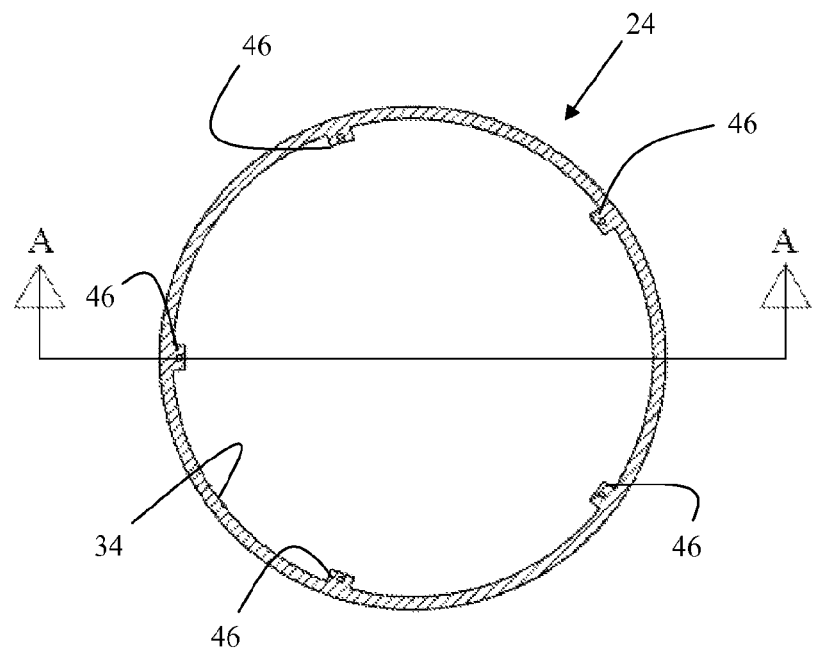
FIG. 6a shows a cross section of a first embodiment of a tower element.
Figure 6B:
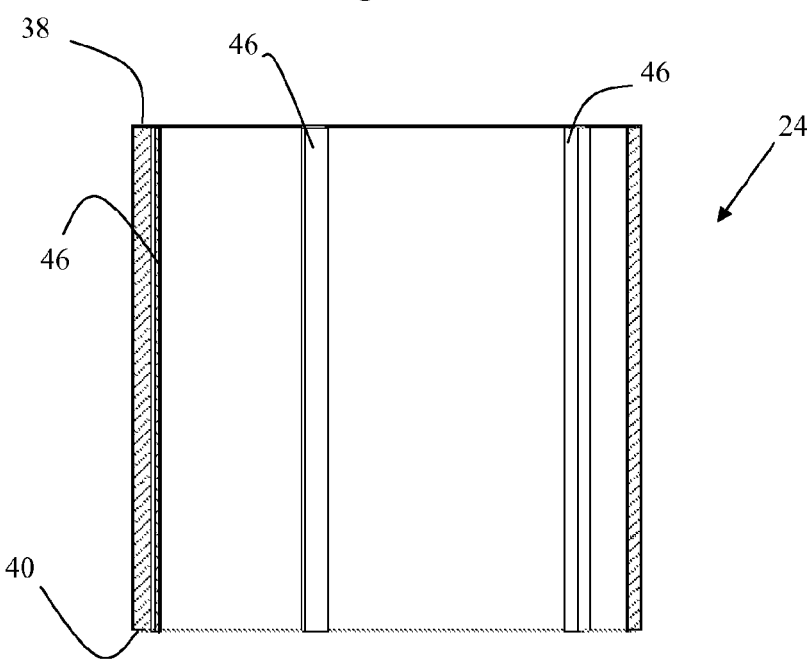
FIG. 6b shows a section view of a tower element along A-A of FIG. 6a, FIG. 7a shows a cross section of a second embodiment of a tower element.

The top tower element 31 comprise attachment means 56 for attachment of a tether (not) shown to control the column 22 during lifting FIG. 6a shows a cross section of a first embodiment of a tower element 24 and FIG. 6b shows a section view of the tower element 24 along A-A of FIG. 6a.

In the embodiment shown in FIGS. 6a and 6b the tower element 24 has five protrusions 46 that are evenly distributed around the inside 34 of the tower element 24.

The tower element 24 has conical top 38 and bottom 40 surfaces. The conical surfaces are arranged such that a bottom surface 40 on one tower element 24 corresponds to a top surface on an adjacent tower element 24. The inclination of the conical surfaces is larger than 0° and less than 10° to limit the shear forces, while achieving acceptable self-centring capabilities of the tower elements 24.

FIGS. 6a and 6b apply to the foundation element in embodiments of the foundation element that is identical with a tower element.

Figure 7A:
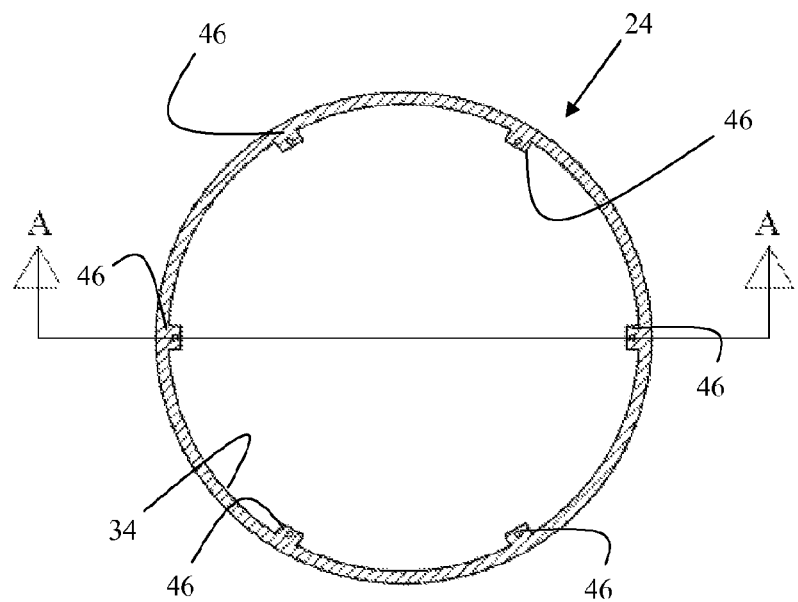
FIG. 7b shows a section view of a tower element along A-A of FIG. 7a, FIG. 8 shows an isometric section view of a third embodiment of a tower element.
Figure 7B:
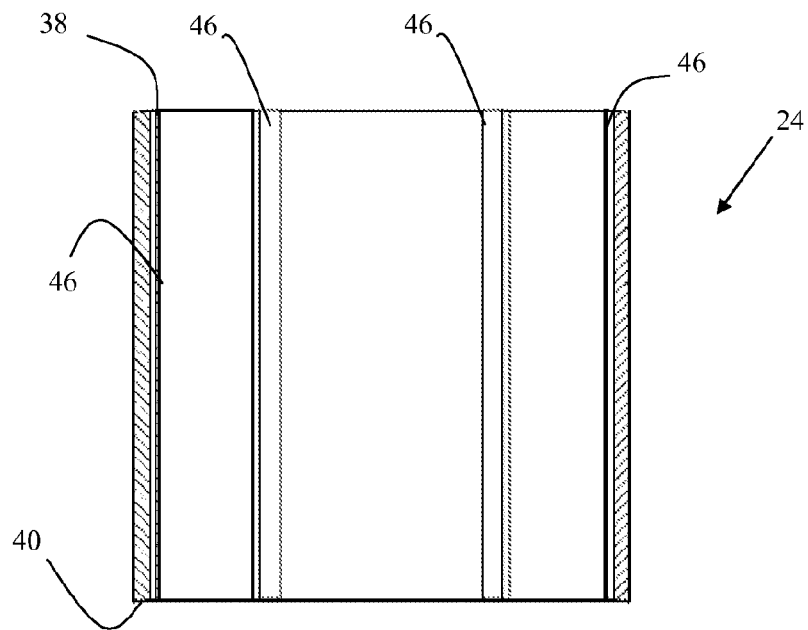

FIG. 7a shows a cross section of a second embodiment of a tower element 24 and FIG. 7b shows a section view of the tower element 24 along A-A of FIG. 7a.

In the embodiment shown in FIGS. 7a and 7b the tower element 24 has six protrusions 46 that are evenly distributed around the inside 34 of the tower element 24.

FIGS. 7a and 7b apply to the foundation element in embodiments of the foundation element that is identical with a tower element.

The tower element 24 has conical top 38 and bottom 40 surfaces. The conical surfaces are arranged such that a bottom surface 40 on one tower element 24 corresponds to a top surface on an adjacent tower element 24. The inclination of the conical surfaces is larger than 0° and less than 10° to limit the shear forces, while achieving acceptable self-centring capabilities of the tower elements 24.

FIGS. 8 and 9, 10 and 11, 12 and 13, 14 and 15 shows an isometric section view and a plan view respectively of a third, fourth, fifth and sixth embodiment of a tower element 24. Each embodiment in FIGS. 8 to 15 is adapted for a section of a tower construction 10 comprising four sections.

Figure 8:
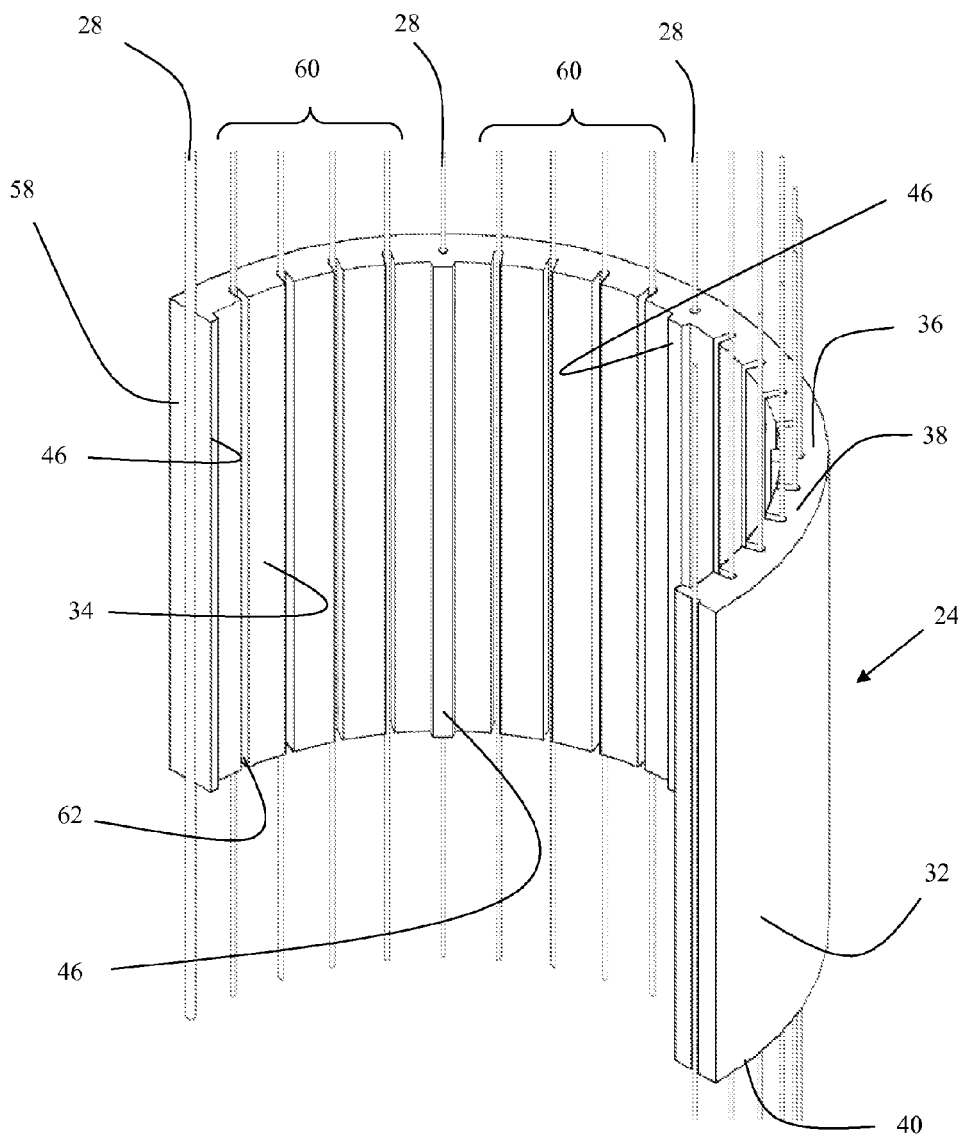
Figure 9:
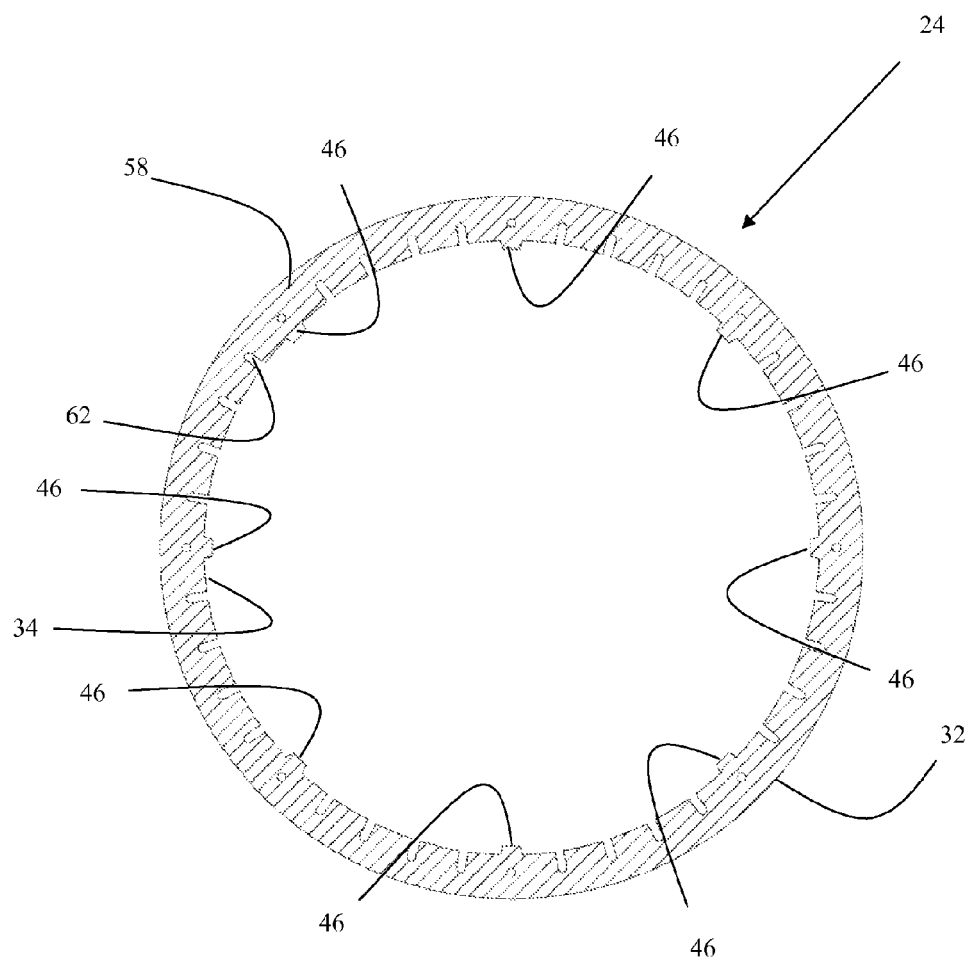
FIG. 9 shows a plan view of a tower element according to FIG. 8.

The third embodiment shown in FIGS. 8 and 9 is adapted for the first section, which is the lowermost section. The first section is located on top of the lower force distribution element 18 (see FIG. 1). Some of the foundation elements 20 (see FIG. 1) may be identical to this third embodiment of the tower element 24.

Figure 10:
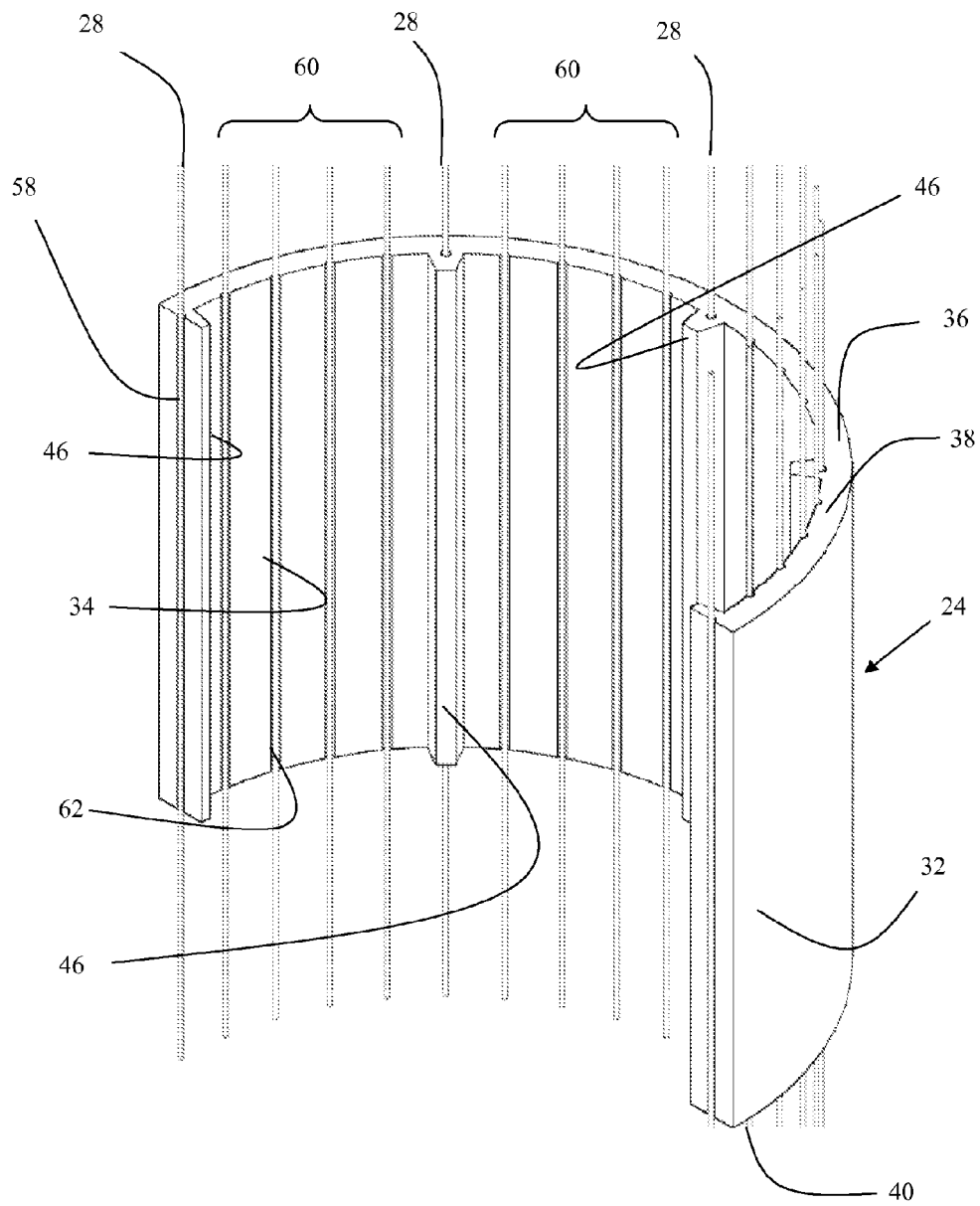
FIG. 10 shows an isometric section view of a fourth embodiment of a tower element.
Figure 11:
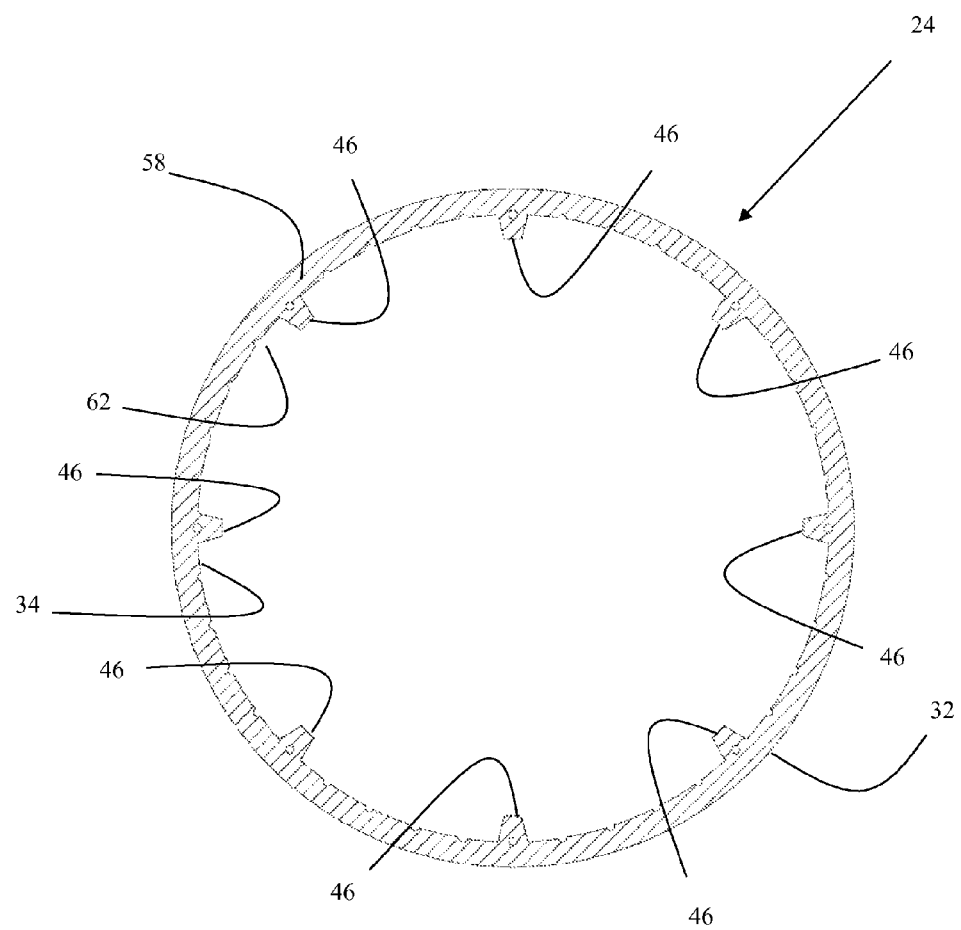
FIG. 11 shows a plan view of a tower element according to FIG. 10.
Figure 12:
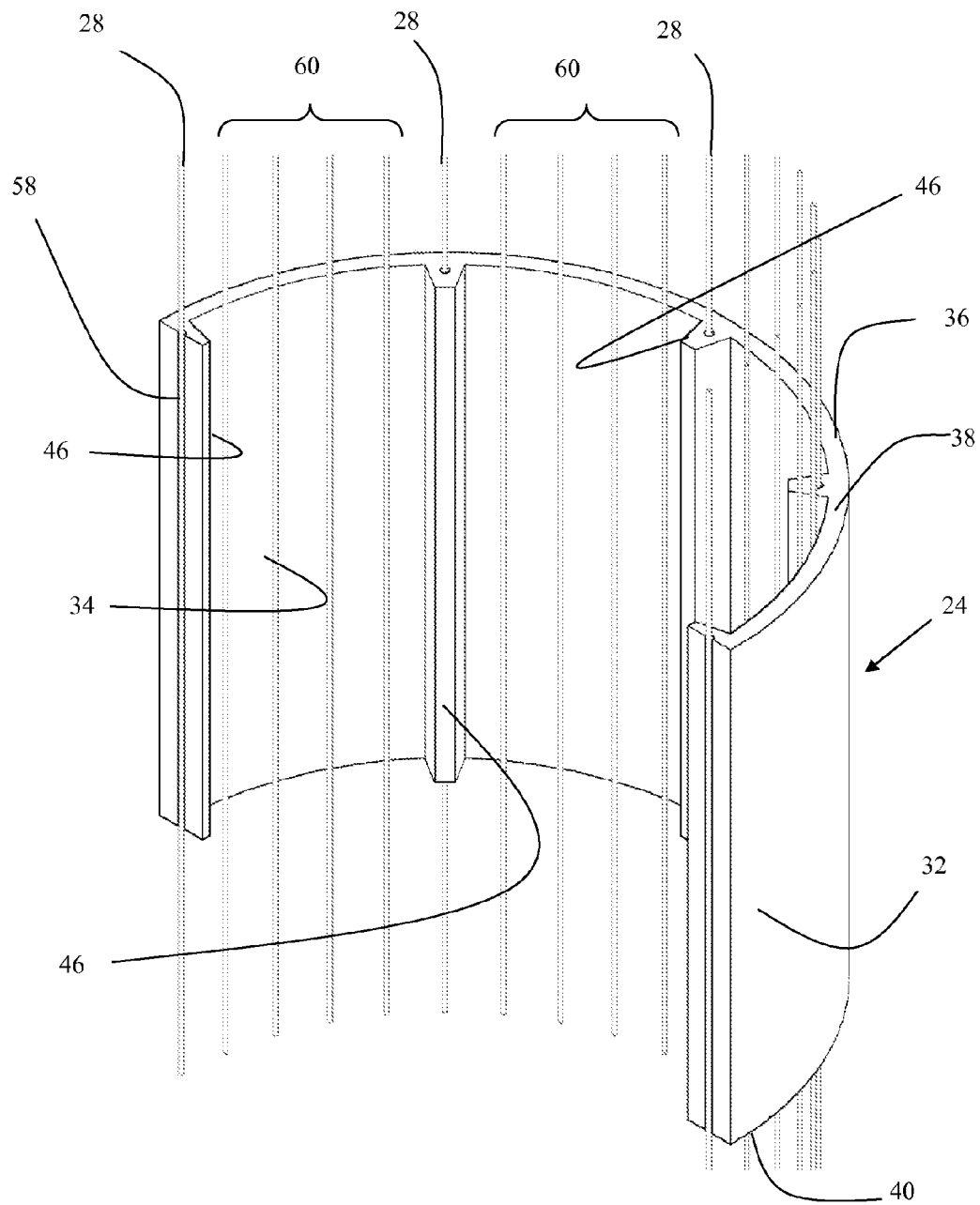
FIG. 12 shows an isometric section view of a fifth embodiment of a tower element.
Figure 13:
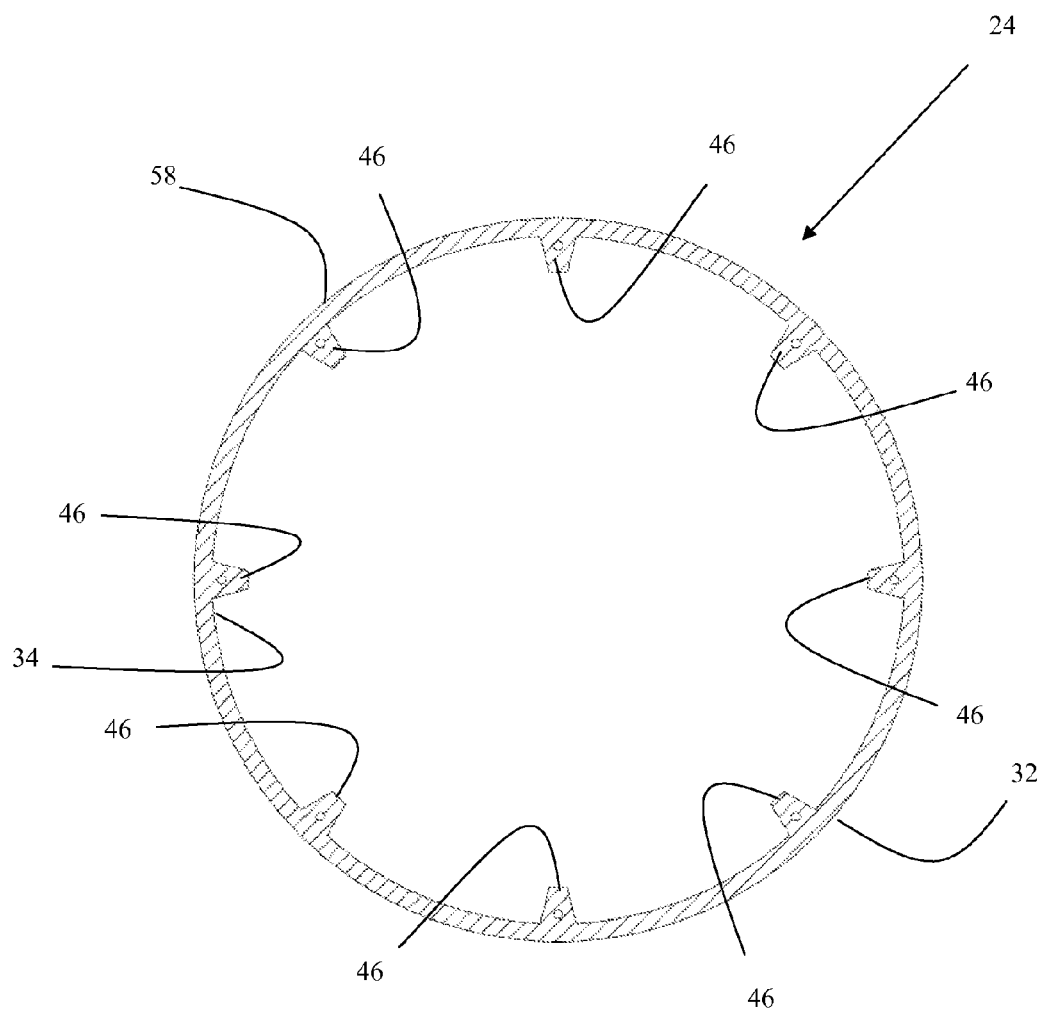
FIG. 13 shows a plan view of a tower element according to FIG. 12.

The fourth embodiment shown in FIG. 10 and 11 is adapted for the second section, which is located on top of the first section, The fifth embodiment shown in FIGS. 12 and 13 is adapted for the third section, which is located on top of the second section.

Figure 14:
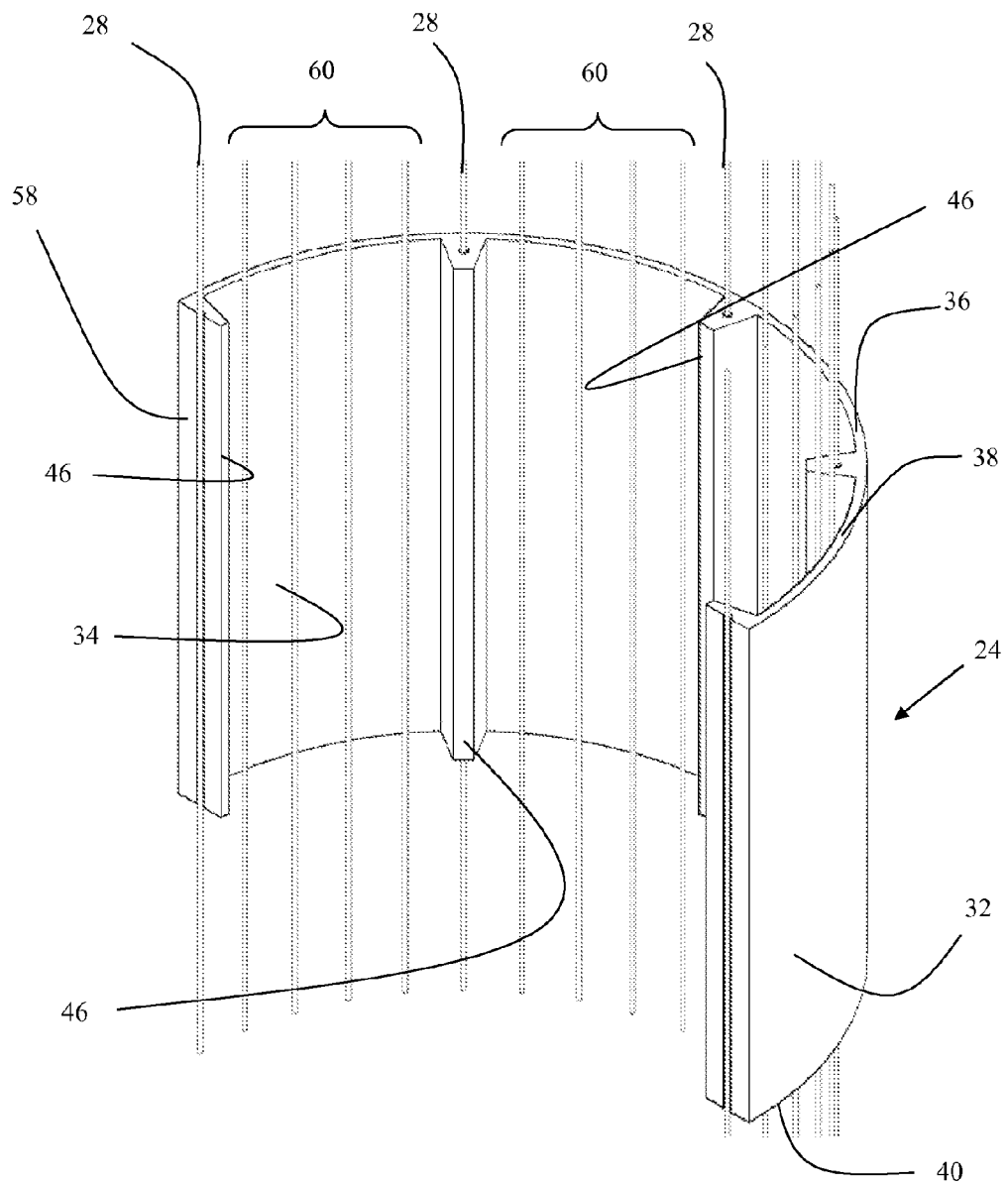
FIG. 14 shows an isometric section view of a sixth embodiment of a tower element.
Figure 15:
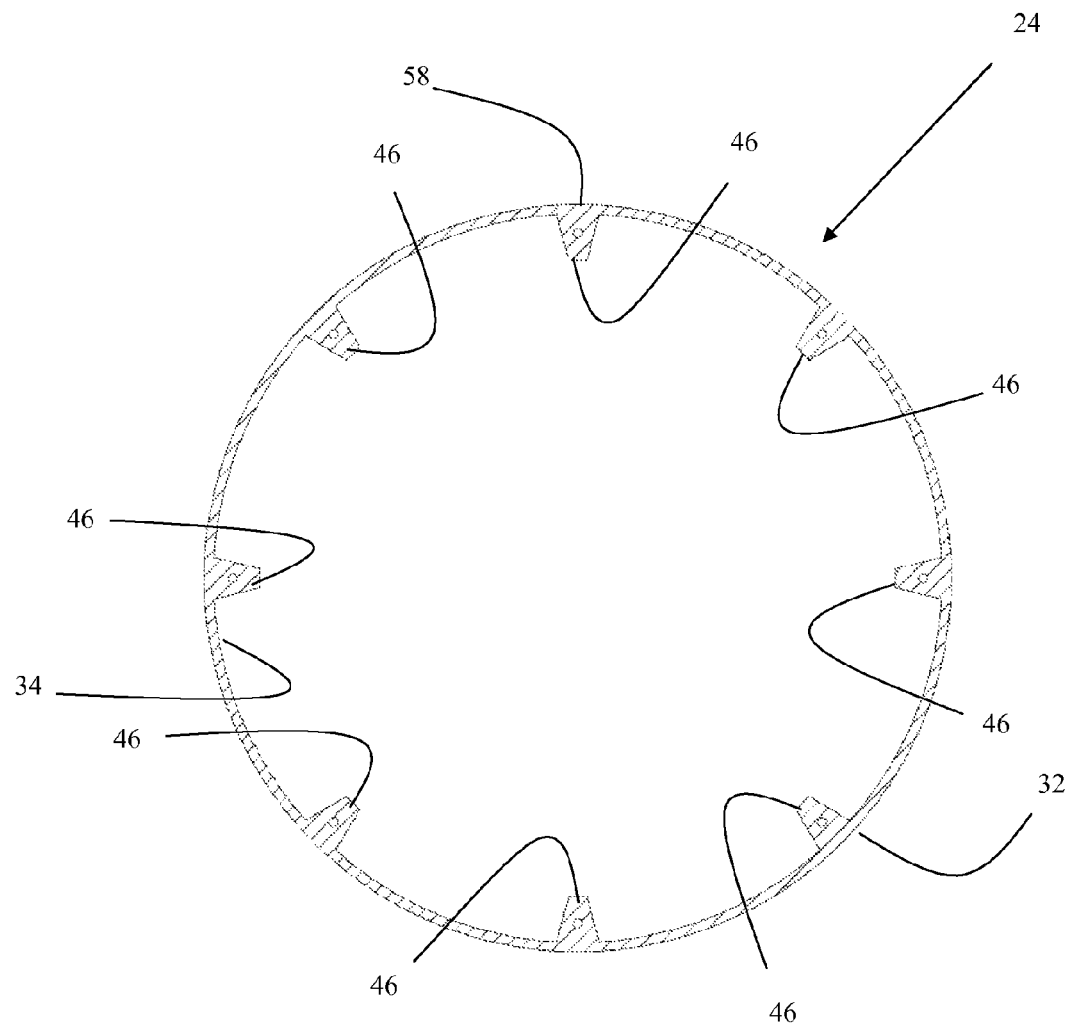
FIG. 15 shows a plan view of a tower element according to FIG. 14.

The sixth embodiment shown in FIGS. 14 and 15 is adapted for the fourth section, which is located on top of the third section. The upper force distribution element 26 (see FIG. 1) is located on top of the fourth section.

The material thickness 36 of the tower elements 24 is decreasing from the third embodiment, which is the thickest tower element 24 to the sixth embodiment, which is the thinnest tower element 24.

Each tower element 24 in FIGS. 8 to 15 comprises an outside wall 58 having an outside 32, an inside 34, a material thickness 36 provided there between, and top 38 and bottom surfaces 40, said tower element 24 having a hollow centre, said tower elements 24 are arranged one tower element 24' on top of another 24" forming a column 22 (se FIG. 1) on top of the foundation 12 (see FIG. 1).

A plurality of interlinking tendons 60 is running through the hollow centre of the tower elements 24 close to the inside 34.

The tower elements 24 include a plurality of protrusions 46. The protrusions 46 are extending between the top 38 and bottom 40 surfaces. Each protrusion 46 has a hollow bore that is parallel with a longitudinal axis through the tower element 24 and hence the tower construction 10 (see FIG. 1). A tendon 28 is running through each protrusion 46 for assisting the alignment of the tower elements 24 during assembly of the column 22 and for providing compression of the column 22 during erection of the tower construction 10.

The tendons 28 and the interlinking tendons 60 are arranged close to the inside 34 of the tower elements 24 of the fourth section, which is the upper most section. It is herewith achieved that the upper force distribution element 26 is sup-ported by the structure of the upper most tower element 24 as close to the attachment point of the tendons 28 and the interlinking tendons 60. The radial bending moments in the upper force distribution element 26 is thereby limited as much as possible.

As the material thickness 36 of the tower elements 24 is increasing towards the lower sections the inside 34 of the tower elements 24 is provided with furrows 62 making room for the tendons 28 and the interlinking tendons 60. This arrangement will increase the area supporting the lower force distribution element 18, and thereby reduce the bending moments in the lower force distribution element 18. The third and fourth embodiment is equipped with furrows 62.

Figure 16:
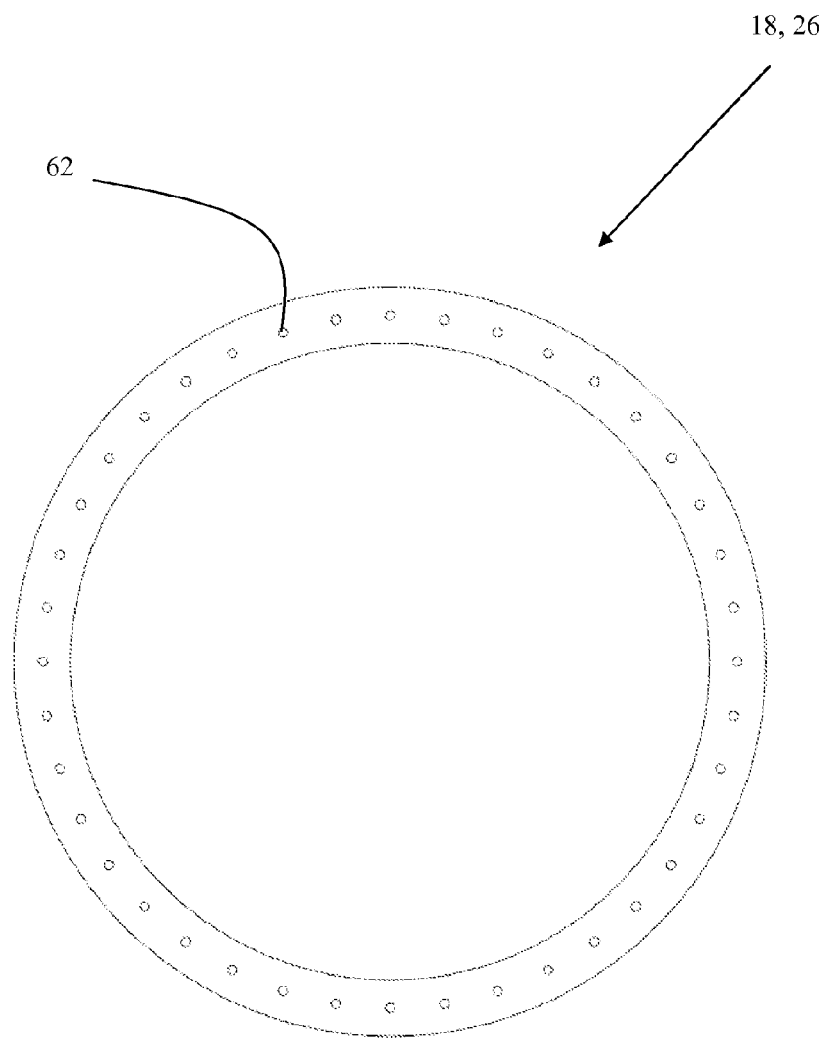
FIG. 16 shows a plan view of a first embodiment of a lower/upper force distribution element.

FIG. 16 shows a plan view of a first embodiment of a lower/upper force distribution element 18, 26. The lower/upper force distribution element 18, 26 is an annulus with evenly distributed openings 64 for the tendons 28 and the interlinking tendons 60. The first embodiment comprises forty openings 64.

Figure 17:
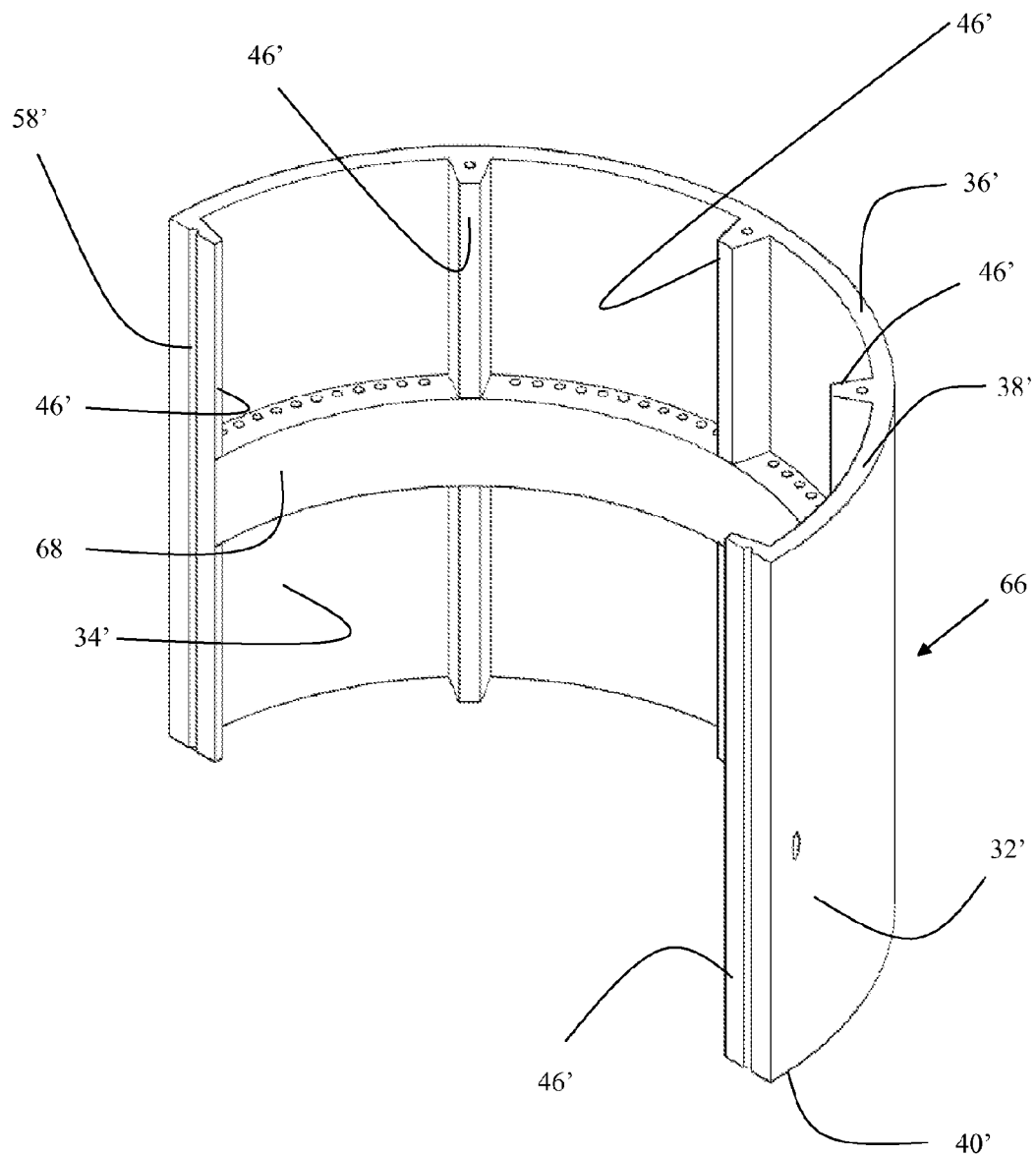
FIG. 17 shows an isometric section view of a first embodiment of an interlinking element.

FIG. 17 shows an isometric section view of a first embodiment of an interlinking element 66. The interlinking element 66 comprises an outside wall 58' having an outside 32', an inside 34', a material thickness 36' provided there between, and top 38' and bottom surfaces 40', said interlinking element 66 having a hollow centre, said interlinking element 66 is adapted for being arranged between to adjacent tower elements 24.

The interlinking element 66 is provided with a circumferential attachment arrangement 68. Said attachment arrangement 68 having co-operating fastening means for attachment of interlinking tendons 60 (see FIG. 8-15).

The interlinking element 66 is having protrusions 46' which correspond to the protrusions on the tower elements 24 (see FIG. 8-15). The protrusions 46' have a hollow bore for running through the tendons 28, such that the tendons 28 may run uninterrupted from the upper force distribution element 26 (see FIG. 1) to the lower force distribution element 18 (see FIG. 1).

Figure 18:
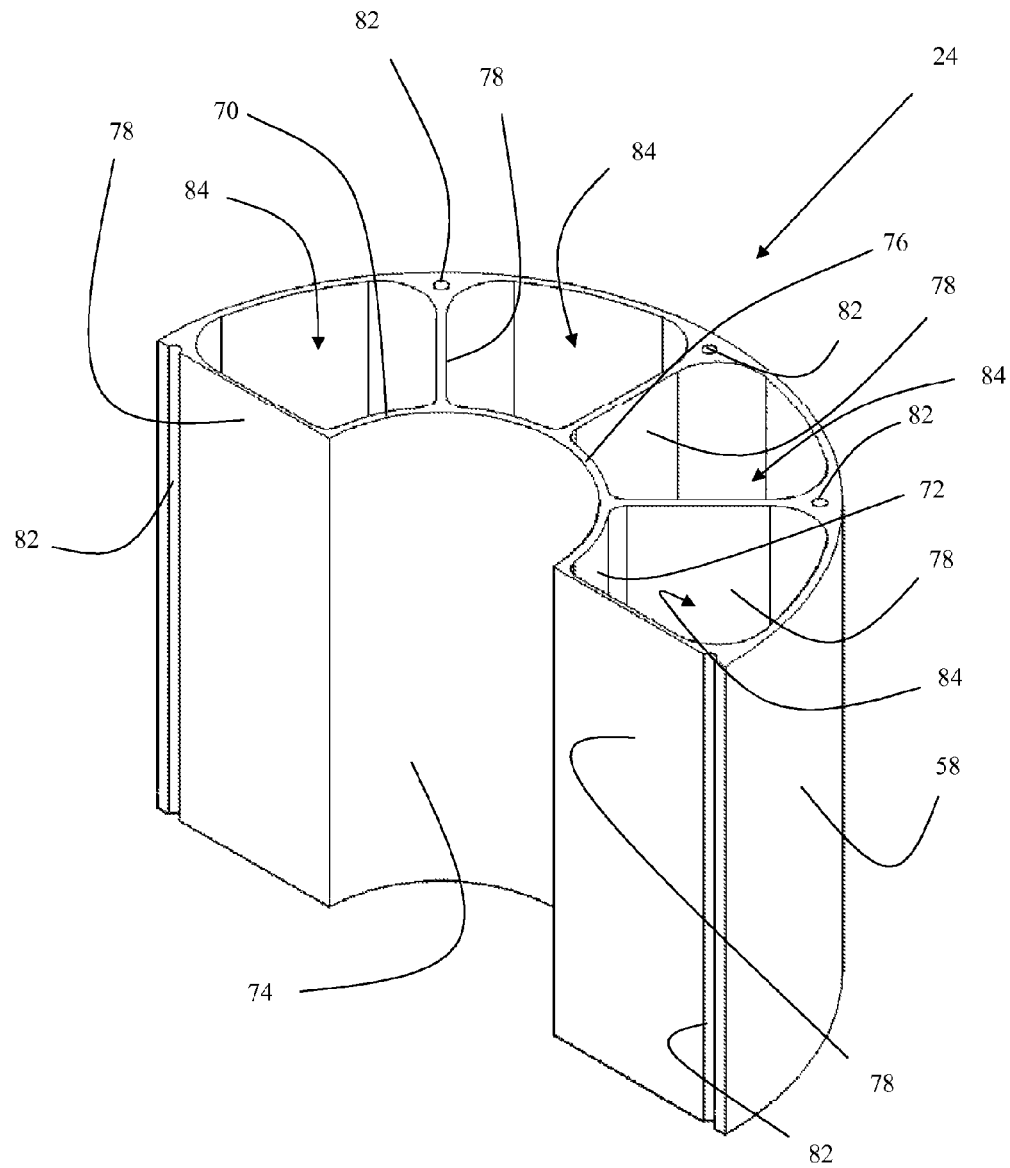
FIG. 18 shows an isometric section view of a seventh embodiment of a tower element.

FIG. 18 shows an isometric section view of a seventh embodiment of a tower element 24. This embodiment comprise an inside wall 70 arranged inside the hollow centre and having an outside 72 and an inside 74 and a material thickness 76 provided there between, wherein the inside wall 70 is connected to the outside wall 58 by a plurality of webs 78.

Hollow bores 82 are provided for the tendons 28 and cavities 84 are provided for the interlinking tendons 60. The number of hollow bores and cavities are defined by engineering analysis.

The centre of the inside wall 70 may be used as an elevator shaft.

The foundation elements may be identical to this seventh embodiment of the tower element.

Figure 19:
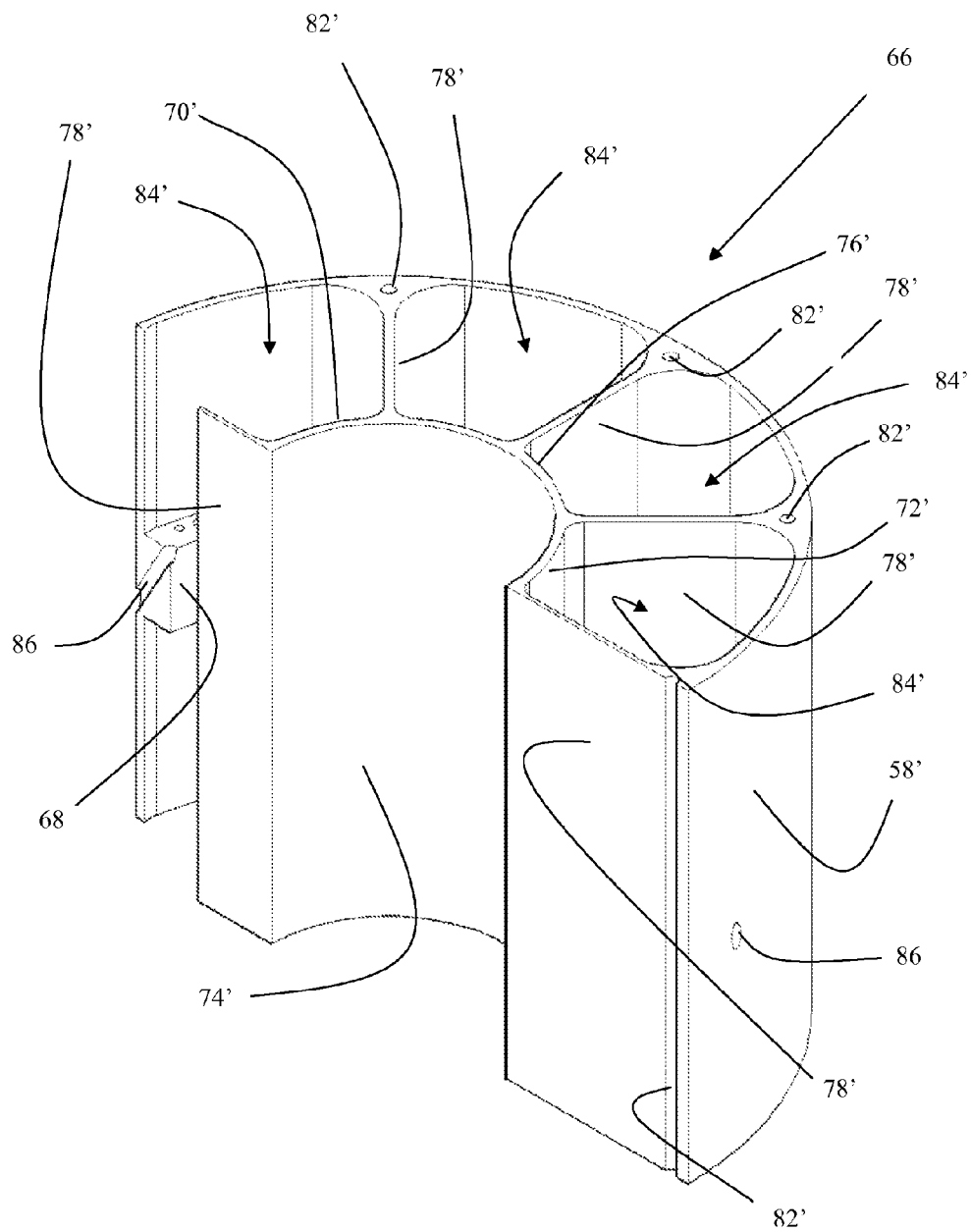
FIG. 19 shows an isometric section view of a second embodiment of an interlinking element.
Figure 20:
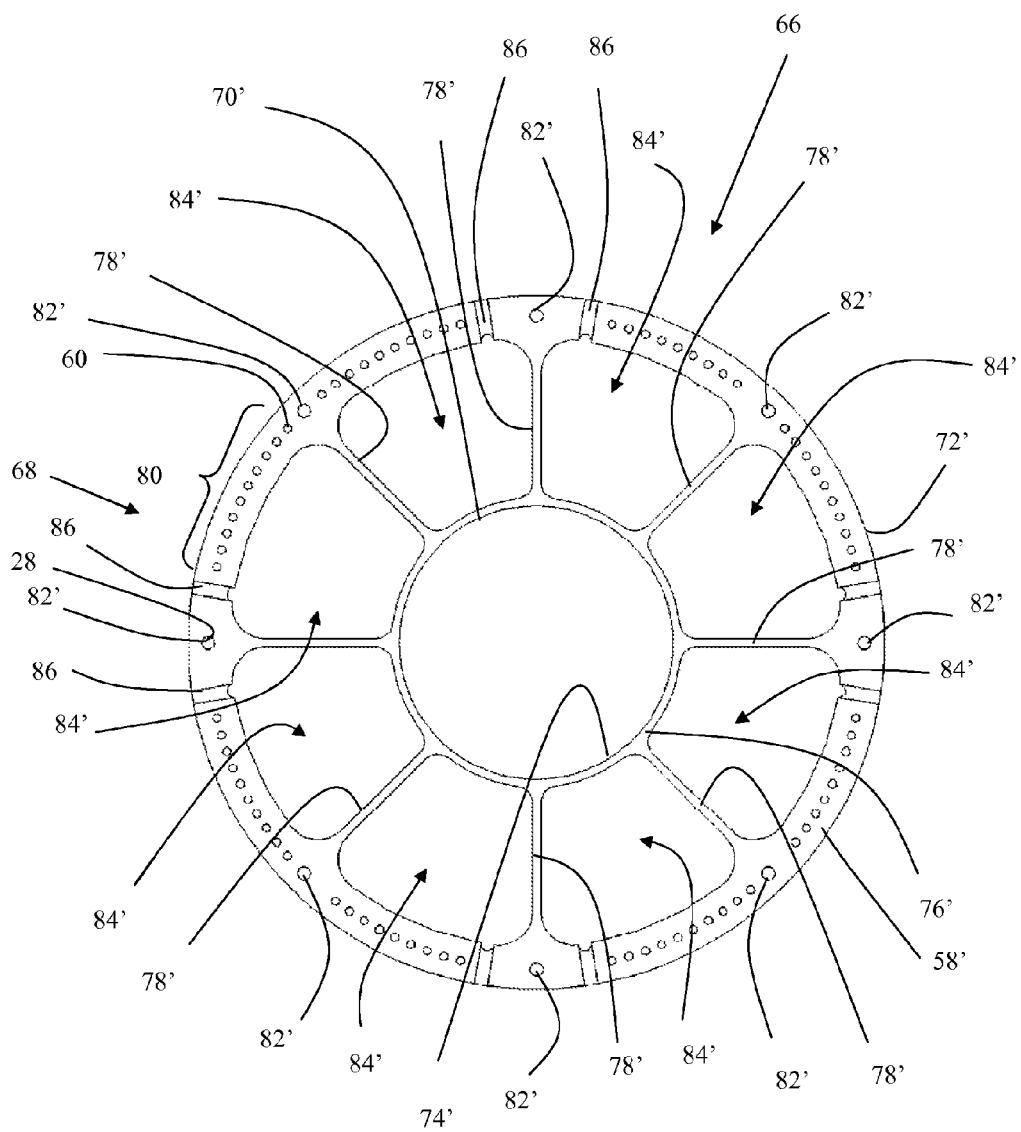
FIG. 20 shows a cross section view of an interlinking element according to FIG. 19.

FIG. 19 shows an isometric section view and FIG. 20 shows a cross section view of a second embodiment of an interlinking element 66. This embodiment comprise an inside wall 70' arranged inside the hollow centre and having an outside 72' and an inside 74' and a material thickness 76' provided there between, wherein the inside wall 70' is connected to the outside wall 58' by a plurality of webs 78'.

Hollow bores 82' are provided for the tendons 28' and cavities 84' are provided for the interlinking tendons 60'.

The centre of the inside wall 70' may be used as an elevator shaft.

Each cavity 84' of the interlinking element 66 is provided with an aperture 86 for providing access for feeding an interlinking tendon 60 through the outside wall 80' to the cavity 84'.

The aperture 86 is directed downwards towards the outside of the interlinking element 66. This is mainly because the interlinking tendons 60 are fed from below, but also because rain water and condensation will tend to run towards the outside of the interlinking element 66.

Anchor cables (not shown) may be fed through the apertures 86 during erection of the tower construction for stabilising the tower during lifting. The anchor cables (not shown) may be attached to the interlinking element 66 by for example a wedge or other suitable attachment means. The anchor cable (not shown) adapted for connection to a ballast (not shown) arranged on the ground.

The number of anchor cables 92 is at least three for providing even stability to the tower construction 10.

Each attachment means 90 may be connected to more than one anchor cable. For example two or three anchor cables 92.

The interlinking element 66 is provided with a circumferential attachment arrangement 68. Said attachment arrangement 68 having co-operating fastening means for attachment of interlinking tendons 60 (see FIG. 8-15).

As seen on FIG. 20 the attachment arrangement 68 for the interlinking tendons 60 comprise a plurality of through holes 80. Interlinking tendons 60 from above the interlinking element 66 is run through every other through hole 80 and attached to the attachment arrangement 68 on the bottom side of the attachment arrangement 68 by cooperating attachment means, for examples a wedge arrangement or any other suitable commercially available attachment means.

Interlinking tendons from below the interlinking element 66 is run through the remaining through holes 80 and attached to the attachment arrangement 68 on the top side of the attachment arrangement 68 by co-operating attachment means, for examples a wedge arrangement or any other suitable commercially available attachment means.

The embodiment shown on FIG. 20 has eighty through holes 80. Therefore forty interlinking tendons 60 may be connected to either side of the interlinking element 66. The number of interlinking tendons 60 may taper towards the top of the tower. The number of through holes 80 may also taper towards the top of the tower or alternatively remain unused.

Figure 21:
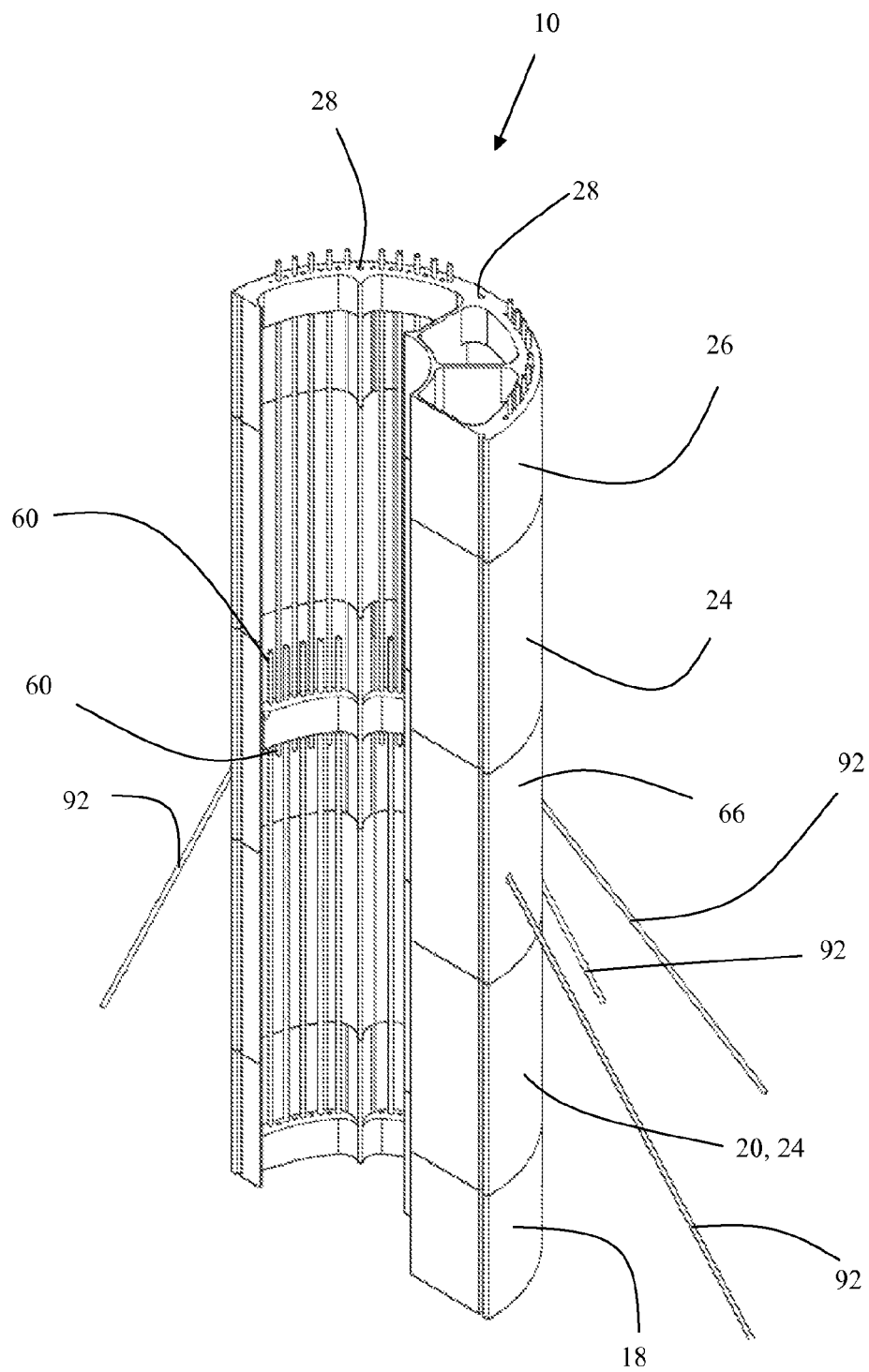
FIG. 21 shows a principle of a sectionalised tower construction.

FIG. 21 shows a principle of a sectionalised tower construction 10. The tower construction comprises two sections. The tower comprises from bottom to top a lower force distribution element 18, a tower element 24/foundation element 20, an interlinking element 66, a tower element 24 and an upper force distribution element 26.

The person skilled in the art will based on FIG. 21 be able to add more elements to construct a taller column 22. The tower construction 10 will in practise have more tower elements 24 in the upper most section and more tower elements 24/foundation elements 20 in the lower most section.

The lower force distribution element 18 and/or the upper force distribution element 26 are identical to the interlinking element 66 but for the lower/upper half respectively.

The tendons 28 are spanning the complete height of the column 22 and the interlinking tendons 60 are only spanning part of that height.

Anchor cables 92, which are adapted for being attached to a ballast on the ground is connected to the interlinking element 66.

Figure 22:
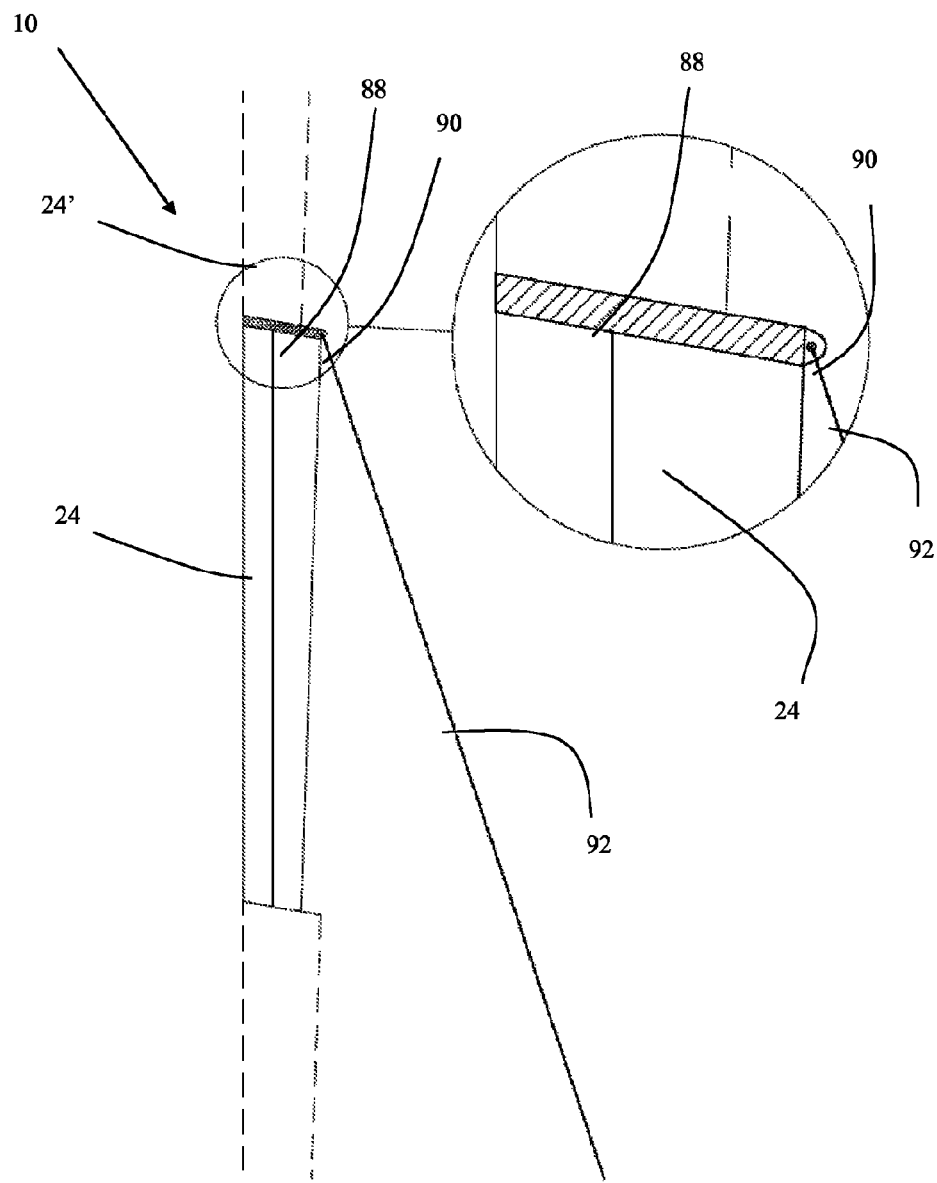
FIG. 22 shows a detail section cut of the tower construction in an embodiment comprising an anchor flange.

FIG. 22 shows a detail section cut of the tower construction 10 in an embodiment comprising an anchor flange 88. The anchor flange 88 is arranged between two adjacent tower elements 24, 24'. The anchor flange 88 has attachment means 90 for an anchor cable 92. The anchor flange 88 has a plurality of attachment means 90 evenly distributed around the perimeter of the anchor flange 88. An anchor cable 92 is connected to each attachment means 90 at one end and being adapted for connection to a ballast (not shown) arranged on the ground at the other end.

The number of anchor cables 92 is at least three for providing even stability to the tower construction 10.

Each attachment means 90 may be connected to more than one anchor cable. For example two or three anchor cables 92.

Figure 23:
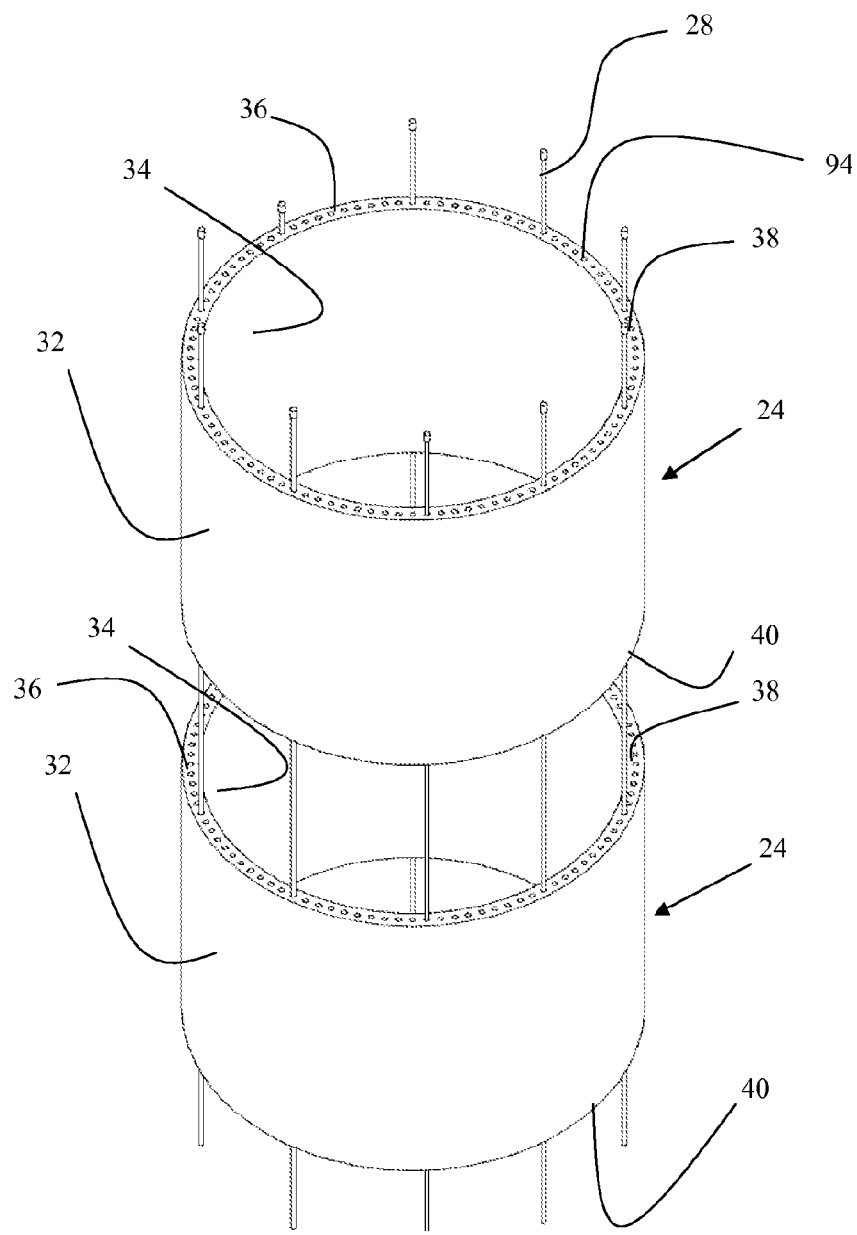
FIG. 23 shows an exploded view an eighth embodiment of two tower elements of the tower construction.

FIG. 23 shows an exploded view an eighth embodiment of two tower elements 24 of the tower construction 10. The tower elements 24 each having an outside 32, an inside 34, a material thickness 36 provided there between, and top 38 and bottom surfaces 40, said tower element 24 having a hollow centre, said tower elements 24 are arranged one tower element 24' on top of another 24" forming a column 22 (se FIG. 1) on top of the foundation 12 (see FIG. 1).

A plurality of hollow bores 94 are provided in the material thickness 36 of the tower elements 24 between the outside 32 and the inside 34. The hollow bores 94 are parallel with the longitudinal axis through the tower element 24 and hence the tower construction 10 (see FIG. 1).

A plurality of tendons 28 is running through the hollow bores 94.

Figure 24:
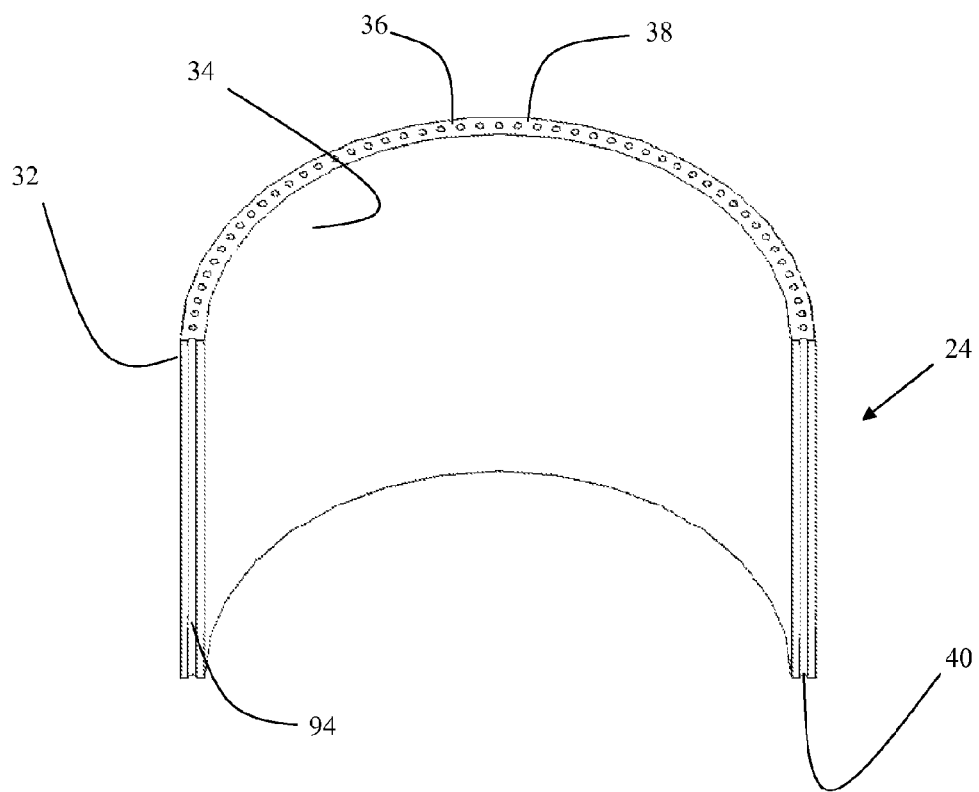
FIG. 24 shows an isometric section view of a eighth embodiment of a tower element.
Figure 25:
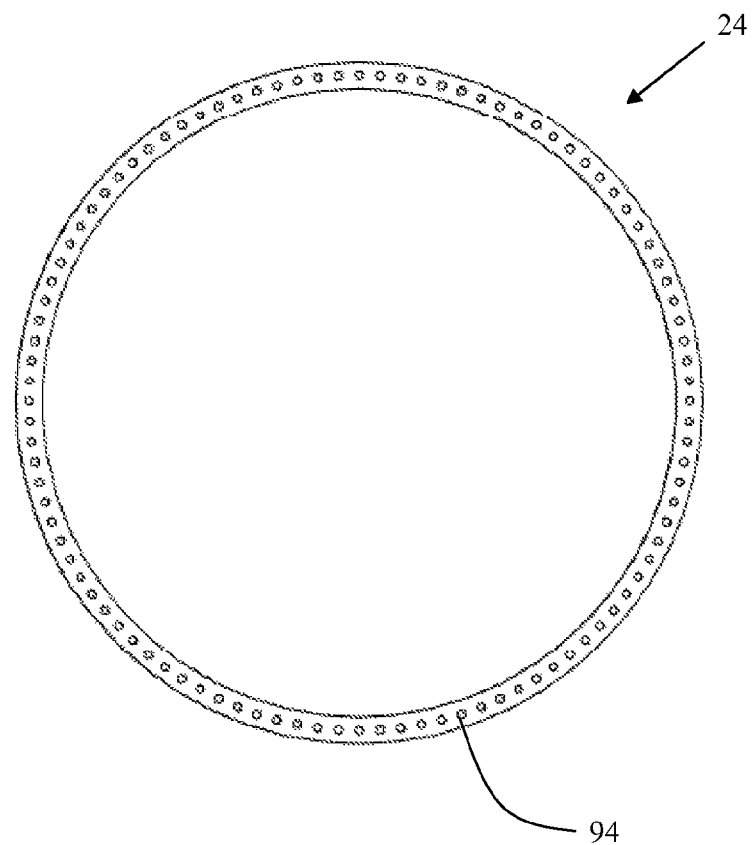
FIG. 25 shows a plan view of a tower element according to FIG. 24.

FIG. 24 shows an isometric section view and FIG. 25 shows a plan view of the eighth embodiment of a tower element 24.

On FIG. 24 the section is cutting through two of the hollow bores 94. FIG. 24 shows the orientation of the hollow bore 94 along the longitudinal axis of the tower element 24.

On FIG. 25 the distribution of the hollow bores 94 can be seen. The hollow bores 94 are distributed evenly in a symmetric pattern around the tower element 24. In alternative embodiments the hollow bores 94 may differ in size and they may be distributed in a non-symmetrical pattern.

The invention claimed is:

1. A concrete tower construction comprising;
   a foundation,
   a plurality of prefabricated concrete tower elements each comprising an outside wall having an outside, an inside, a material thickness provided there between, and top and bottom surfaces, said tower elements having a hollow centre, said tower elements are arranged one tower element on top of another forming a column on top of the foundation,
   a plurality of tendons arranged in the hollow centre or within the material thickness, for applying a tension force to the column,
   wherein the tower construction further comprises an upper force distribution element arranged on top of the column and a lower force distribution element arranged in the foundation,
   wherein each tendon is connected to the upper force distribution element and to the lower force distribution element by co-operating attachments,
   wherein the foundation includes at least one prefabricated concrete foundation element comprising an outside wall having an outside, an inside, a material thickness provided there between, and top and bottom surfaces, said at least one prefabricated concrete foundation element having a hollow centre,
   wherein said at least one foundation element is arranged between the column and the lower force distribution element,
   wherein the at least one prefabricated concrete foundation element together with the lower force distribution elements are positioned below the surface of the ground, and wherein the foundation further comprises in-situ cast concrete in which the at least one foundation element together with the lower force distribution element are embedded.

2. A tower construction according to claim 1, wherein the upper force distribution element and/or the lower force distribution element is an annulus, wherein the annulus has a free portion for attachment of the tendons.

3. A tower construction according to claim 1, wherein each of the tower elements is a cylinder or a frustum, having an upper wide end and a lower narrow end or a combination of said cylinder and frustum.

4. A tower construction according to claim 1, wherein each of the tower elements includes a plurality of protrusions extending into the hollow centre, wherein the protrusions have hollow bores and said hollow bores extend parallel to the longitudinal axis of the tower construction.

5. A tower construction according to claim 4, wherein the protrusions extend between the top and bottom surfaces of the tower elements.

6. A tower construction according to claim 1, wherein adjacent tower elements have corresponding conical top and bottom surfaces.

7. A tower construction according to claim 1, wherein the tower construction further comprises a top tower element, wherein said top tower element is attached to the top of the column with co-operating fastening means and wherein the top tower element has an additional fastening arranged for installation of a wind turbine nacelle.

8. A tower construction according to claim 1, wherein said tower construction further comprises at least one interlinking element comprising an outside wall having an outside, an inside, a material thickness provided there between, and top and bottom surfaces, said interlinking element having a hollow centre, said at least one interlinking element is arranged between the lower and the upper force distribution elements, and said tower construction further comprises a plurality of interlinking tendons, wherein each interlinking tendon is arranged in the hollow centre of the interlinking element, wherein the interlinking element end the interlinking tendon has co-operating attachment means, and wherein each interlinking tendon at one end is attached to an interlinking element, and at the other end to the upper force distribution element or the lower force distribution element or a further interlinking element.

9. A tower construction according to claim 8, wherein the interlinking element further comprise an inside wall arranged inside the hollow centre and having an outside and an inside and a material thickness provided there between, wherein the inside wall is connected to the outside wall by a plurality of webs.

10. A tower construction according to claim 1, wherein the tower elements further comprises an inside wall arranged inside the hollow centre and having an outside and an inside and a material thickness provided there between, wherein the inside wall is connected to the outside wall by a plurality of webs.

11. A tower construction according to claim 1, wherein the foundation element further comprise an inside wall arranged inside the hollow centre and having an outside and an inside and a material thickness provided there between, wherein the inside wall is connected to the outside wall by a plurality of webs.

12. A tower construction according to claim 1, wherein the tower construction further comprises at least one anchor flange, said anchor flange being arranged between two adjacent tower elements, and a plurality of anchor cables, said plurality of anchor cables being evenly distributed around the perimeter of the anchor flange, and each anchor cable being connected to the anchor flange at one end and being adapted for connection to a ballast arranged on the ground at the other end.

13. A concrete tower construction according to claim 1, each concrete tower element having an outside, an inside, a material thickness provided there between, and top and bottom surfaces, said tower element having a hollow centre, wherein the tower element includes a plurality of protrusions extending into the hollow centre, wherein each of the protrusions has a hollow bore, said hollow bore extending parallel to the longitudinal axis of the tower element.

14. A concrete tower construction according to claim 1, wherein at least one foundation element is made of concrete, wherein the at least one foundation element includes a plurality of attachment means on the outside, and wherein each attachment means is arranged for attachment to a rebar or a rebar cage.

15. A concrete tower construction according to claim 14 wherein the foundation element includes a plurality of protrusions extending into the hollow centre, wherein each of the protrusions has a hollow bore, said hollow bore extend parallel to the longitudinal axis of the foundation element.

16. A concrete tower construction according to claim 1, wherein the in-situ cast concrete is established around the at least one prefabricated foundation element and the lower force distribution element below the surface of the ground.

17. A concrete tower construction according to claim 1, wherein the foundation comprises a prefabricated support element on top of which the lower force distribution element is arranged; wherein the support element and is also positioned below the surface of the ground; and wherein the in-situ cast portion is provided around the combination of the support element, the lower force distribution element, and the at least one prefabricated foundation element.

18. A method for erecting a tower construction comprising the following steps:
   a. establishing a foundation having a lower force distribution element,
   b. providing a plurality of prefabricated concrete tower elements, each having an outside, an inside, a material thickness provided there between, and top and bottom surfaces, said tower element having a hollow centre,
   c. forming a column by arranging one tower element on top of another until the final height of the column is reached,
   d. providing a plurality of tendons,
   e. connecting each tendon to an upper force distribution element and the lower force distribution element by co-operating attachment means, and
   f. tensioning each tendon for applying a tension force to the column, wherein the step of establishing a foundation comprises the following steps:
      a1. locating and aligning the lower force distribution element,
      a2. providing at least one prefabricated concrete foundation element having an outside, an inside, a material thickness provided there between, and top and bottom surfaces, said foundation element having a hollow centre,
      a3. arranging said at least one prefabricated foundation element on top of the lower force distribution element, and
      a4. in-situ casting on the outside of said at least one prefabricated foundation element.

19. A method according to claim 18, wherein the step of forming a column comprises the following steps:

c1. securing a first tower element for lifting,
c2. lifting the first tower element,
c3. positioning the first tower element above the foundation,
c4. locating an additional tower element on top of the foundation,
c5. lowering the first tower element onto the additional tower element,
c6. connecting the first tower element and the additional tower element for partly forming a column, and
c7. repeating step c1. to c6. with the partly formed column and the first tower element until the final height of the column is reached.

20. A method according to claim 19, wherein step b further comprises:
b' providing each tower element with at least six evenly distributed protrusions extending into the hollow centre, wherein the protrusions has a hollow bore, said hollow bore extending parallel to the longitudinal axis of the tower construction, wherein
c1. further comprises running a tendon through each bore of the protrusions of the first tower element, and wherein
c6. further comprises running a tendon through each bore of the protrusions of the additional tower element and temporarily attaching each tendon to the upper most tower element and the lower most tower element and applying a tension force to each tendon and maintaining the tension during lifting, and wherein step c6. when repeated comprises relieving the tension force of every other tendon, running every other tendon through every other bore of the protrusions of the additional tower element and temporarily attaching every other tendon to the upper most tower element and the lower most tower element and applying a tension force to every other tendon, relieving the tension force of the remaining tendons, running the remaining tendons through the remaining bores of the protrusions of the additional tower element and temporarily attaching the remaining tendons to the upper most tower element and the lower most tower element and applying a tension force to the remaining tendons.

21. A method according to claim 18, wherein the step of forming a column further comprises:
dividing the tower into sections by providing at least one interlinking element for each section
inserting an interlinking element replacing a tower element at the end of each section,
providing a plurality of interlinking tendons,
connecting each interlinking tendon at one end of the section to the interlinking element and at the other end of the section to an element selected among the upper force distribution element, the lower force distribution element or an additional interlinking element, and
tensioning each interlinking tendon for applying a tension force to the section.

* * * * *